United States Patent
Wakita et al.

(10) Patent No.: US 10,620,481 B2
(45) Date of Patent: Apr. 14, 2020

(54) OPTICAL ALIGNMENT FILM COMPOSITION, OPTICAL ALIGNMENT FILM, OPTICAL LAMINATE, AND IMAGE DISPLAY DEVICE

(71) Applicant: FUJIFILM Corporation, Tokyo (JP)

(72) Inventors: Taku Wakita, Kanagawa (JP); Ayako Muramatsu, Kanagawa (JP); Chie Moriya, Kanagawa (JP); Yoshiaki Takada, Kanagawa (JP); Makoto Ishiguro, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 37 days.

(21) Appl. No.: 15/957,367

(22) Filed: Apr. 19, 2018

(65) Prior Publication Data

US 2018/0246381 A1   Aug. 30, 2018

Related U.S. Application Data

(63) Continuation of application No. PCT/JP2016/081306, filed on Oct. 21, 2016.

(30) Foreign Application Priority Data

| Oct. 23, 2015 | (JP) | 2015-208966 |
| Jan. 8, 2016 | (JP) | 2016-002397 |
| Sep. 20, 2016 | (JP) | 2016-183221 |

(51) Int. Cl.
*G02F 1/1337* (2006.01)
*C08K 5/101* (2006.01)
(Continued)

(52) U.S. Cl.
CPC ......... *G02F 1/133711* (2013.01); *C08F 8/14* (2013.01); *C08F 120/32* (2013.01);
(Continued)

(58) Field of Classification Search
CPC ......... G02F 1/133711; G02F 1/133788; G02F 1/133528; G02F 1/13363;
(Continued)

(56) References Cited

U.S. PATENT DOCUMENTS

| 6,005,038 A | 12/1999 | Yu et al. |
| 7,531,223 B2 | 5/2009 | Tazaki et al. |

(Continued)

FOREIGN PATENT DOCUMENTS

| JP | H10239688 A | 9/1998 |
| JP | 2004-053770 A | 2/2004 |

(Continued)

OTHER PUBLICATIONS

International Search Report issued in PCT/JP2016/081306 dated Nov. 29, 2016.

(Continued)

*Primary Examiner* — Ruiyun Zhang
(74) *Attorney, Agent, or Firm* — Edwards Neils LLC; Jean C. Edwards, Esq.

(57) ABSTRACT

According to the invention, provided are an optical alignment film composition with which an optical alignment film having excellent aligning properties can be produced, and an optical alignment film, an optical laminate, and an image display device produced using the optical alignment film composition. An optical alignment film composition according to the invention contains a polymer A which has a constitutional unit a1 including a cinnamate group and a low-molecular-weight compound B which has a cinnamate group and has a lower molecular weight than the polymer A.

20 Claims, 2 Drawing Sheets

(51) Int. Cl.
*C08F 120/32* (2006.01)
*C09D 183/06* (2006.01)
*G02B 5/30* (2006.01)
*C09D 133/14* (2006.01)
*C09D 4/00* (2006.01)
*C08F 8/14* (2006.01)
*C08F 222/10* (2006.01)
*C08L 101/02* (2006.01)
*G02F 1/1335* (2006.01)
*C08G 77/14* (2006.01)
*G02F 1/13363* (2006.01)

(52) U.S. Cl.
CPC ............ *C08F 222/10* (2013.01); *C08K 5/101* (2013.01); *C08L 101/02* (2013.01); *C09D 4/00* (2013.01); *C09D 133/14* (2013.01); *C09D 183/06* (2013.01); *G02B 5/3016* (2013.01); *G02F 1/133528* (2013.01); *G02F 1/133788* (2013.01); *C08G 77/14* (2013.01); *G02F 1/13363* (2013.01); *G02F 2001/133715* (2013.01); *G02F 2001/133726* (2013.01); *G02F 2202/28* (2013.01); *Y10T 428/10* (2015.01); *Y10T 428/1005* (2015.01); *Y10T 428/1036* (2015.01)

(58) Field of Classification Search
CPC ........ G02F 2001/133715; G02F 2001/133726; G02B 5/3016; C08L 101/10; C08K 5/101; Y10T 428/10; Y10T 428/1005; Y10T 428/1036
USPC .... 428/1.1, 1.2, 1.3, 1.31; 349/123, 127, 96, 349/98, 117–119; 359/489.07, 489.01, 359/489.02
See application file for complete search history.

(56) References Cited

U.S. PATENT DOCUMENTS

| | | | |
|---|---|---|---|
| 9,733,519 | B2 | 8/2017 | Hatanaka et al. |
| 2006/0141171 | A1* | 6/2006 | Tazaki .............. C09K 19/2007 |
| | | | 428/1.21 |
| 2006/0165918 | A1 | 7/2006 | Ito |
| 2015/0042944 | A1 | 2/2015 | Hatanaka et al. |
| 2016/0334557 | A1 | 11/2016 | Asanoi et al. |
| 2016/0355735 | A1 | 12/2016 | Motooka et al. |

FOREIGN PATENT DOCUMENTS

| | | |
|---|---|---|
| JP | 2006-209073 A | 8/2006 |
| JP | 2006-209098 A | 8/2006 |
| JP | 5459520 B2 | 4/2014 |
| JP | 2014-170130 A | 9/2014 |
| JP | 2014-173130 A | 9/2014 |
| JP | 2015-152743 A | 8/2015 |
| JP | 2015-163938 A | 9/2015 |
| JP | 2015-163951 A | 9/2015 |
| KR | 10-2014-0109315 A | 9/2014 |
| WO | 2010/150748 A1 | 12/2010 |
| WO | 2015/068678 A1 | 5/2015 |
| WO | 2015/122334 A1 | 8/2015 |

OTHER PUBLICATIONS

Written Opinion issued in PCT/JP2016/081306 dated Nov. 29, 2016.
International Preliminary Report on Patentability completed by WIPO dated Apr. 24, 2018, in connection with International Patent Application No. PCT/JP2016/081306.
Office Action, issued by the Japanese Patent Office dated May 7, 2019, in connection with Japanese Patent Application No. 2017-545814.
Office Action, issued by the Korean Intellectual Property Office dated Oct. 8, 2019, in connection with Korean Patent Application No. 10-2018-7011262.

* cited by examiner

OPTICAL ALIGNMENT FILM COMPOSITION, OPTICAL ALIGNMENT FILM, OPTICAL LAMINATE, AND IMAGE DISPLAY DEVICE

CROSS-REFERENCE TO RELATED APPLICATIONS

This application is a Continuation of PCT International Application No. PCT/JP2016/081306 filed on Oct. 21, 2016, which was published under PCT Article 21(2) in Japanese, and which claims priority under 35 U.S.C. § 119(a) to Japanese Patent Application No. 2015-208966 filed on Oct. 23, 2015, Japanese Patent Application No. 2016-002397 filed on Jan. 8, 2016 and Japanese Patent Application No. 2016-183221 filed on Sep. 20, 2016. The above applications are hereby expressly incorporated by reference, in their entirety, into the present application.

BACKGROUND OF THE INVENTION

1. Field of the Invention

The present invention relates to an optical alignment film composition, an optical alignment film, an optical laminate, and an image display device.

2. Description of the Related Art

Optical films such as optical compensation sheets or retardation films are used in various image display devices in order to solve image staining or enlarge a view angle.

A stretched birefringence film has been used as an optical film, but in recent years, using an optical anisotropic layer made from a liquid crystal compound has been proposed in place of the stretched birefringence film.

Regarding such an optical anisotropic layer, it has been known that an alignment film is provided on a support which forms the optical anisotropic layer in order to align the liquid crystal compound. As the alignment film, an optical alignment film subjected to an optical alignment treatment in place of a rubbing treatment has been known.

For example, a "thermosetting film forming composition having optical aligning properties which contains an acrylic copolymer as a component (A) having a photodimerization site and a thermal crosslinking site and a crosslinking agent as a component (B)" is described in JP5459520B ([claim 1]). An aspect in which the photodimerization site of the component (A) is a cinnamoyl group is also described ([claim]).

SUMMARY OF THE INVENTION

The inventors have conducted studies on the conventional optical alignment film composition described in JP5459520B and the like, and found that an optical alignment film to be formed does not have sufficient aligning properties in accordance with conditions for an optical alignment treatment due to the material of a support (for example, polymer film or polarizer) which forms the optical alignment film composition.

Accordingly, an object of the invention is to provide an optical alignment film composition with which an optical alignment film having excellent aligning properties can be produced, and an optical alignment film, an optical laminate, and an image display device produced using the optical alignment film composition.

The inventors have conducted intensive studies in order to achieve the object, and as a result, found that the aligning properties of an optical alignment film to be formed are improved by using a composition containing a low-molecular-weight compound having a cinnamate group and a polymer having a constitutional unit including a cinnamate group, whereby the inventors have completed the invention.

That is, the inventors have found that the object can be achieved with the following configuration.

[1] An optical alignment film composition comprising a polymer A which has a constitutional unit a1 including a cinnamate group, and a low-molecular-weight compound B which has a cinnamate group and has a lower molecular weight than the polymer A.

[2] The optical alignment film composition according to [1], in which the low-molecular-weight compound B has a molecular weight of 200 to 500.

[3] The optical alignment film composition according to [1] or [2], in which the content of the low-molecular-weight compound B is 10 to 500 mass % with respect to the mass of the constitutional unit a1 of the polymer A.

[4] The optical alignment film composition according to any one of [1] to [3], in which the low-molecular-weight compound B is a compound represented by Formula (B1),

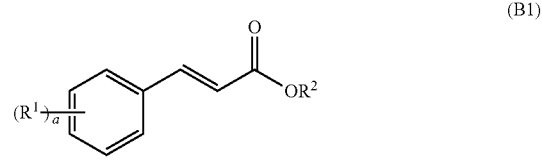

here, in Formula (B1), a represents an integer of 0 to 5, $R^1$ represents a hydrogen atom or a monovalent organic group, and $R^2$ represents a monovalent organic group, and in a case where a is 2 or greater, a plurality of $R^1$'s may be the same as or different from each other.

[5] The optical alignment film composition according to any one of [1] to [4], in which the polymer A further has a constitutional unit a2 including a crosslinkable group.

[6] The optical alignment film composition according to any one of [1] to [5], further comprising a crosslinking agent C having a crosslinkable group.

[7] An optical alignment film which is produced using the optical alignment film composition according to any one of [1] to [6], comprising at least one selected from the group consisting of a cyclobutane ring provided by dimerization of the cinnamate groups of the polymer A and the low-molecular-weight compound B included in the optical alignment film composition and a structure provided by isomerization of the cinnamate groups.

[8] An optical laminate comprising the optical alignment film according to [7] and an optical anisotropic layer which is provided on the optical alignment film and contains a liquid crystal compound.

[9] The optical laminate according to [8], comprising, in order, a support, the optical alignment film, and the optical anisotropic layer.

[10] The optical laminate according to [9], in which a glass transition temperature of the support is 100° C. or lower.

[11] The optical laminate according to [9] or [10], in which the support is a polarizer.

[12] The optical laminate according to [9], further comprising a resin layer between the support and the optical alignment film, in which the resin layer contains a compound having a partial structure represented by Formula (X).

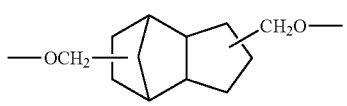

[13] The optical laminate according to [12], further comprising another optical anisotropic layer which is different from the optical anisotropic layer between the resin layer and the optical alignment film.

[14] The optical laminate according to [13], in which another optical anisotropic layer contains a liquid crystal compound.

[15] An optical laminate which is produced by laminating the optical laminate according to any one of [9] and [12] to [14] on a polarizer and by peeling off the support in the optical laminate, in which the optical anisotropic layer and the polarizer are laminated.

[16] An image display device comprising the optical laminate according to any one of [8] to [15].

[17] The image display device according to [16], comprising, in order, a polarizer, an adhesive layer or a pressure sensitive adhesive layer, an optical anisotropic layer, an optical alignment film, an adhesive layer or a pressure sensitive adhesive layer, and a display element, in which no support is provided between the optical alignment film and the display element.

According to the invention, it is possible to provide an optical alignment film composition with which an optical alignment film having excellent aligning properties can be produced, and an optical alignment film, an optical laminate, and an image display device produced using the optical alignment film composition.

DESCRIPTION OF THE PREFERRED EMBODIMENTS

Figure 1A:
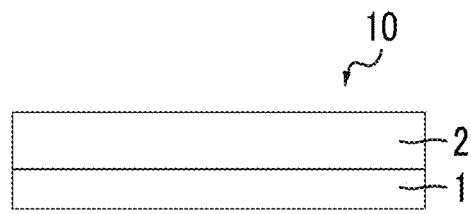
FIG. 1A is a cross-sectional view schematically illustrating an example of an optical laminate according to the invention.

Hereinafter, the invention will be described in detail.

The following description of constituent requirements is based on typical embodiments of the invention, but the invention is not limited thereto.

In this specification, a numerical value range expressed using "to" means a range including numerical values before and after "to" as a lower limit value and an upper limit value.

[Optical Alignment Film Composition]

An optical alignment film composition according to the invention is an optical alignment film composition which contains a polymer A which has a constitutional unit a1 including a cinnamate group and a low-molecular-weight compound B which has a cinnamate group and has a lower molecular weight than the polymer A.

Here, in this specification, the cinnamate group is a group having a cinnamic acid structure containing a cinnamic acid or a derivative thereof as a basic skeleton, and refers to a group represented by Formula (I) or (II).

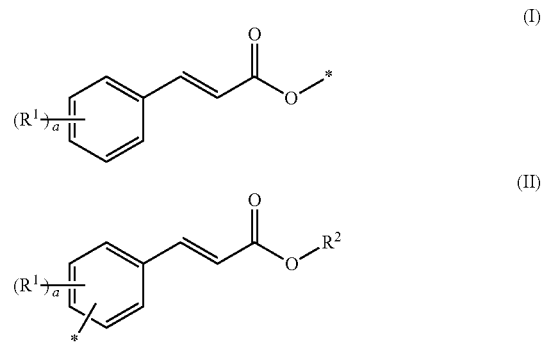

(In the formulae, a represents an integer of 0 to 5, $R^1$ represents a hydrogen atom or a monovalent organic group, and $R^2$ represents a monovalent organic group. In a case where a is 2 or greater, a plurality of $R^1$'s may be the same as or different from each other. * represents a bond.)

Since the optical alignment film composition according to the invention contains all of the polymer A and the low-molecular-weight compound B as described above, an optical alignment film to be produced has improved aligning properties.

The detailed reason for this is not clear, but the inventors have presumed the reason to be as follows.

First, the inventors have found that in a case where a temperature condition for an optical alignment treatment is relaxed due to the material of a support which forms the optical alignment film composition, sufficient alignment does not proceed in a case where a composition containing no low-molecular-weight compound B is used.

Therefore, in the invention, it is thought that by mixing the low-molecular-weight compound B, the aligning properties of the cinnamate group of the polymer A can be improved by the alignment of the low-molecular-weight compound B acting in an auxiliary manner or as a starting point.

Hereinafter, the polymer A, the low-molecular-weight compound B, and predetermined components contained in the optical alignment film composition according to the invention will be described in detail.

[Polymer A]

The polymer A contained in the optical alignment film composition according to the invention is not particularly limited as long as it is a polymer having a constitutional unit a1 including a cinnamate group. A polymer which has been known can be used.

The molecular weight range of the polymer A is, for example, preferably 1,000 to 500,000, more preferably 2,000 to 300,000, and even more preferably 3,000 to 200,000 in terms of the weight average molecular weight.

Here, the weight average molecular weight is defined as a polystyrene (PS) equivalent calculated by gel permeation chromatography (GPC) measurement, and in the invention, the measurement by GPC can be performed using HLC-8220GPC (manufactured by TOSOH CORPORATION) and using TSKgel Super HZM-H, HZ4000, and HZ2000 as columns.

<Constitutional Unit a1 Including Cinnamate Group>

Examples of the constitutional unit a1 including a cinnamate group n the polymer A include a repeating unit represented by any one of Formulae (A1) to (A4).

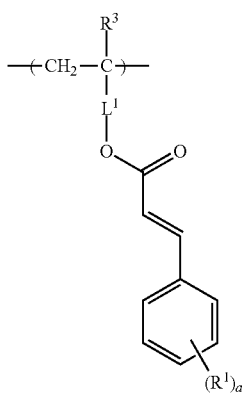
(A1)

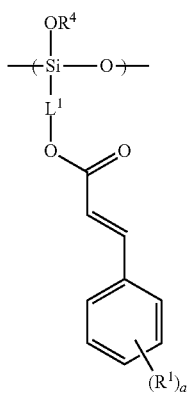
(A2)

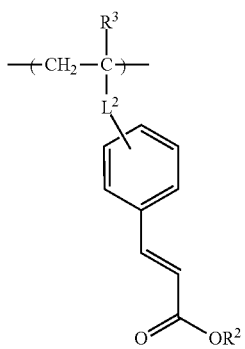
(A3)

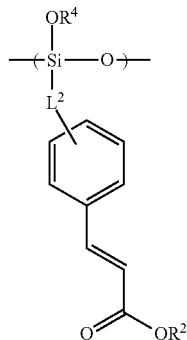
(A4)

Here, in Formulae (A1) and (A3), $R^3$ represents a hydrogen atom or a methyl group. In Formulae (A2) and (A4), $R^4$ represents an alkyl group having 1 to 6 carbon atoms.

In Formulae (A1) and (A2), $L^1$ represents a single bond or a divalent linking group, a represents an integer of 0 to 5, and $R^1$ represents a hydrogen atom or a monovalent organic group.

In Formulae (A3) and (A4), $L^2$ represents a divalent linking group, and $R^2$ represents a monovalent organic group.

Specific examples of the alkyl group having 1 to 6 carbon atoms represented by $R^4$ include a methyl group, an ethyl group, an n-propyl group, an isopropyl group, and an n-butyl group. Among these, for example, a methyl group or an ethyl group is preferable.

Specific examples of $L^1$ include —CO—O-Ph-, —CO—O—$(CH_2)_n$—, and —$(CH_2)_n$-Cy-. Here, Ph represents a divalent benzene ring (for example, phenylene group) which may have a substituent, Cy represents a divalent cyclohexane ring (for example, cyclohexane-1,4-diyl group) which may have a substituent, and n represents an integer of 1 to 4.

Specific examples of $L^2$ include —O—CO— and —O—CO—$(CH_2)_m$—O—. Here, in represents an integer of 1 to 6.

Examples of the monovalent organic group represented by $R^1$ include a chain or cyclic alkyl group having 1 to 20 carbon atoms, an alkoxy group having 1 to 20 carbon atoms, and an aryl group having 6 to 20 carbon atoms which may have a substituent.

Examples of the monovalent organic group represented by $R^2$ include a chain or cyclic alkyl group having 1 to 20 carbon atoms and an aryl group having 6 to 20 carbon atoms which may have a substituent.

a is preferably 1, and $R^1$ preferably has a at the para-position.

Examples of Ph, Cy, and the optional substituent of the aryl group described above include an alkoxy group, a hydroxy group, a carboxyl group, and an amino group.

Specific examples of the constitutional unit represented by Formula (A1) include the following constitutional units.

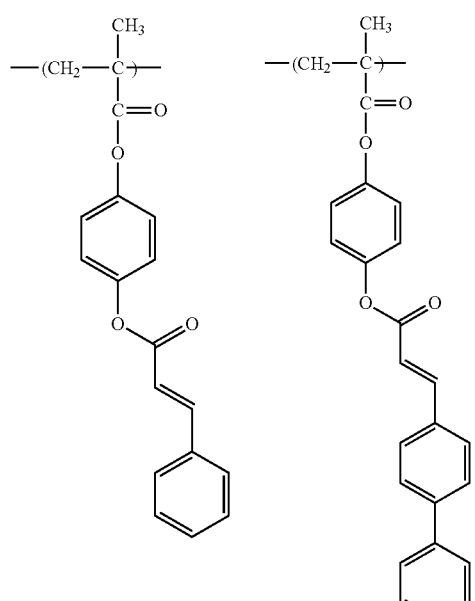
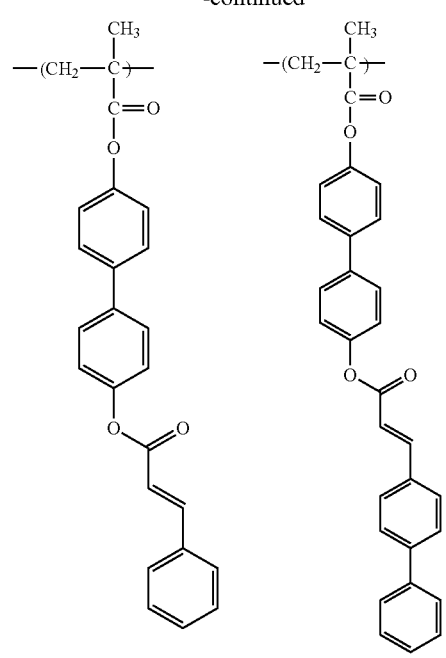
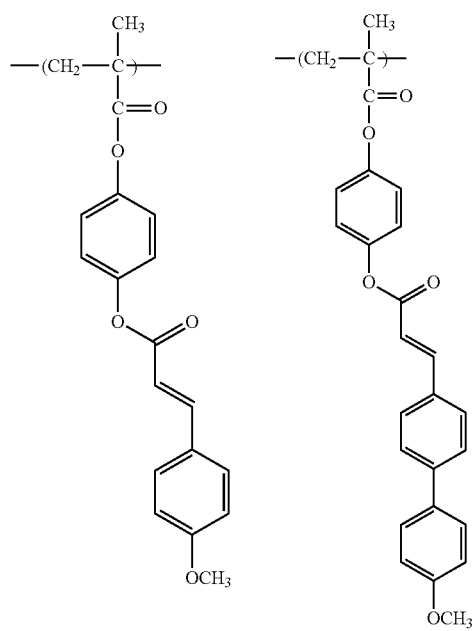
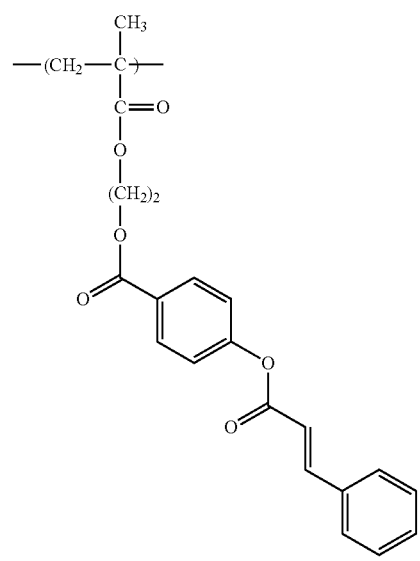

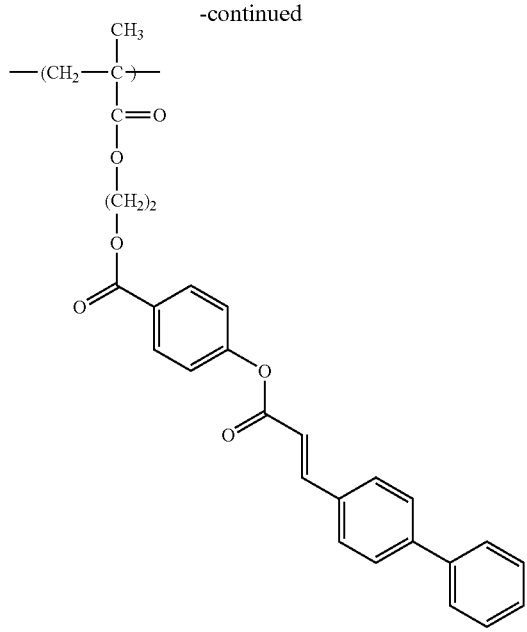

Specific examples of the constitutional unit represented by Formula (A2) include the following constitutional unit.

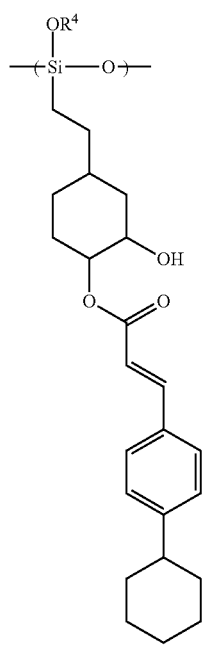

Other examples of the constitutional unit represented by Formula (A1) or (A2) include the following constitutional units having a cinnamate group described in paragraph [0016] of JP2015-026050A. In the following structures, * represents a bonding position of a polymer with a main chain structure.

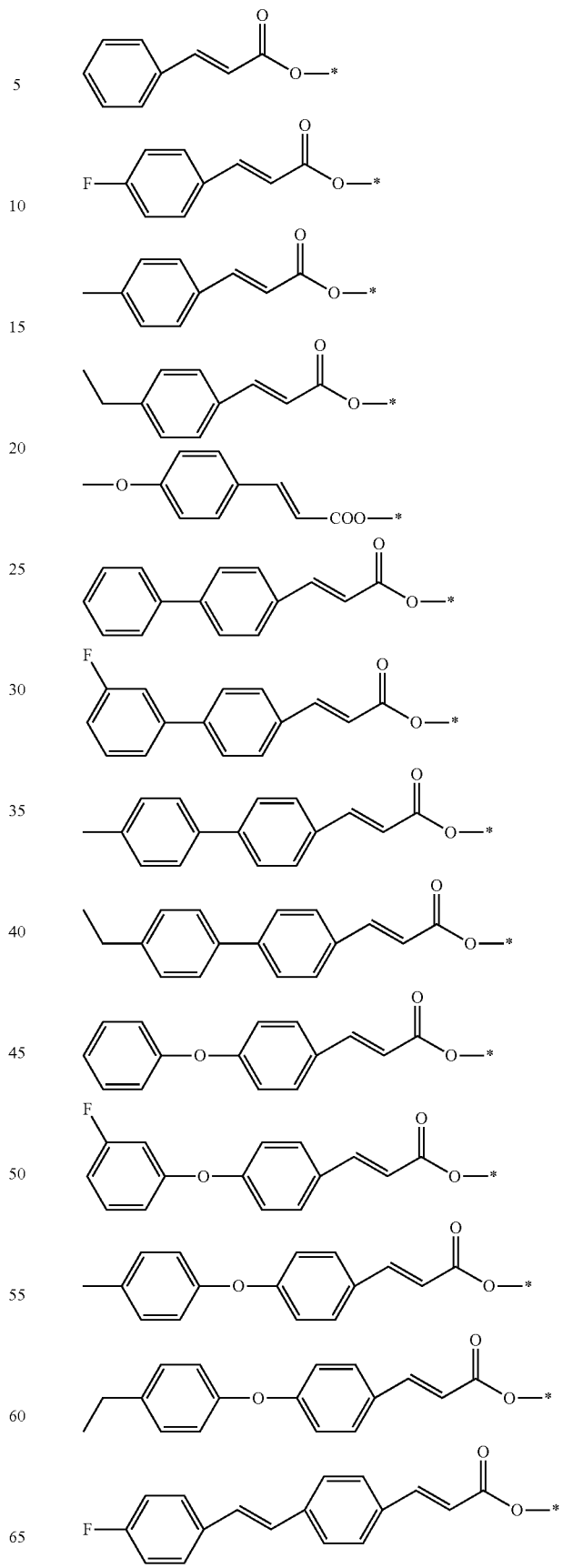

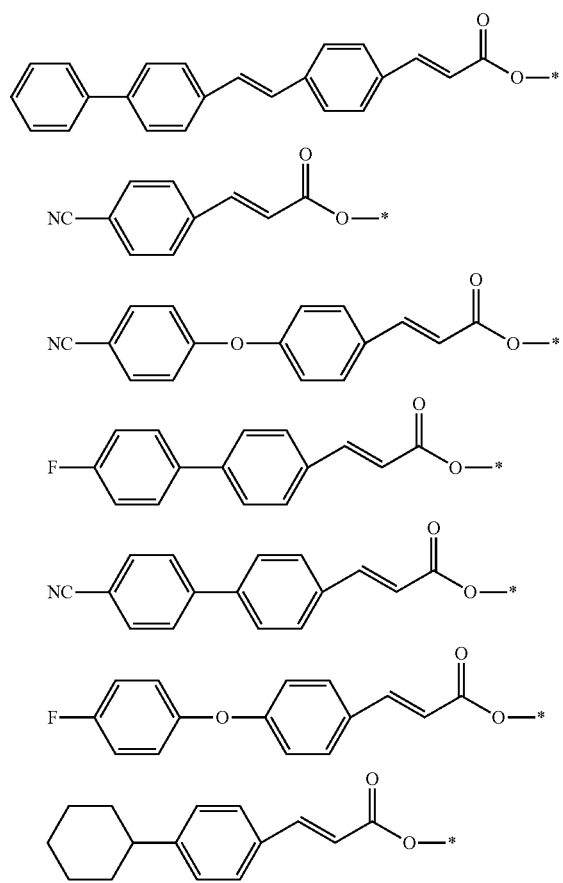
Examples of the constitutional unit represented by Formula (A3) or (A4) include the following constitutional units having a cinnamate group described in paragraph [0016] of JP2015-026050A. In the following structures, * represents a bonding position of a polymer with a main chain structure.
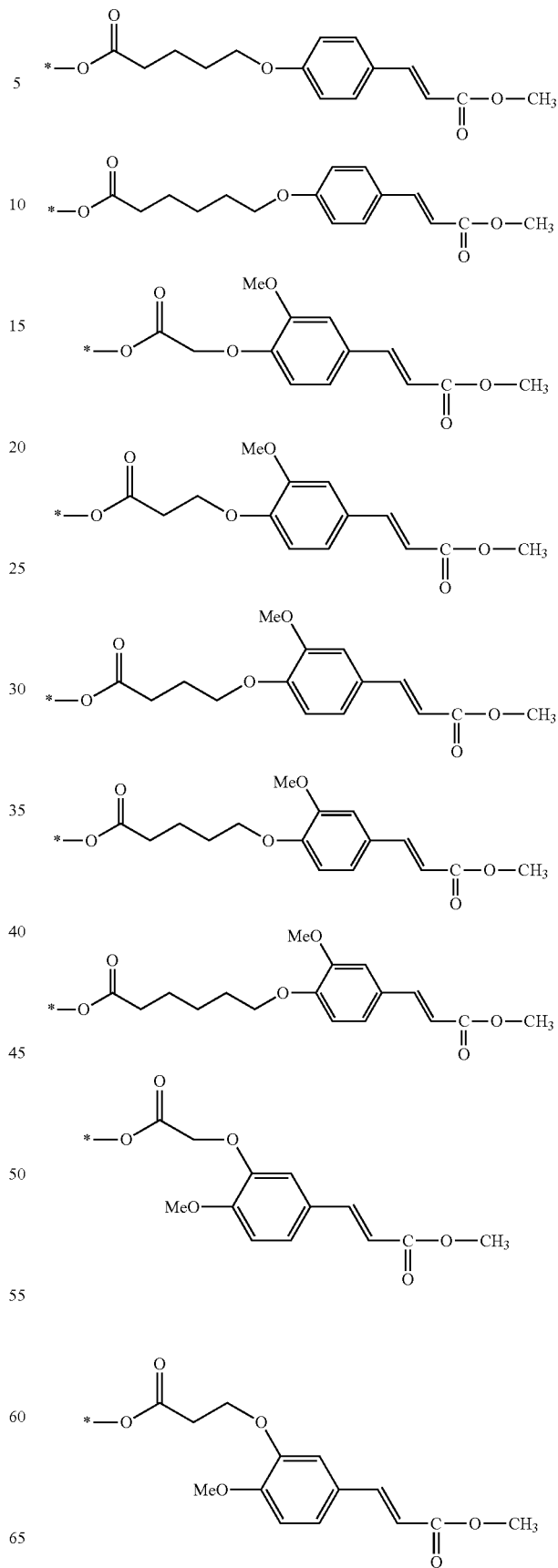

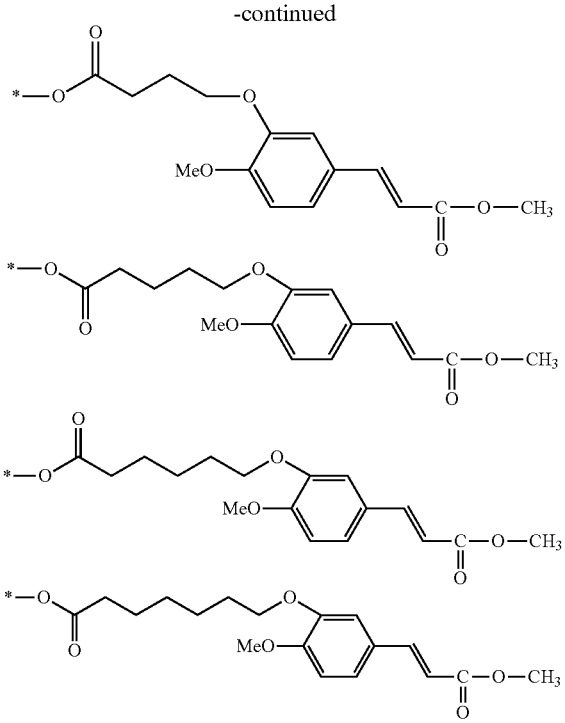

<Constitutional Unit a2 Including Crosslinkable Group>

In the invention, the polymer A preferably further has a constitutional unit a2 including a crosslinkable group since the aligning properties are further improved.

The crosslinkable group is preferably a thermal crosslinkable group causing a curing reaction by the action of heat.

Examples of the constitutional unit a2 having a crosslinkable group include a constitutional unit including at least one selected from the group consisting of an epoxy group, an oxetanyl group, a group represented by —NH—CH$_2$—O—R. (R represents a hydrogen atom or an alkyl group having 1 to 20 carbon atoms), an ethylenically unsaturated group, and a blocked isocyanate group.

Among these, a constitutional unit having an epoxy group and/or an oxetanyl group is preferable. A cyclic ether group of a three-membered ring is also referred to as an epoxy group, and a cyclic ether group of a four-membered ring is also referred to as an oxetanyl group.

Specific examples of the radically polymerizable monomer which is used to form a constitutional unit having an epoxy group include glycidyl acrylate, glycidyl methacrylate, glycidyl α-ethylacrylate, glycidyl α-n-propylacrylate, glycidyl α-n-butylacrylate, 3,4-epoxybutyl acrylate, 3,4-epoxybutyl methacrylate, 3,4-epoxycyclohexylmethyl acrylate, 3,4-epoxycyclohexylmethyl methacrylate, 3,4-epoxycyclohexylmethyl α-ethyl acrylate, o-vinylbenzyl glycidyl ether, m-vinylbenzyl glycidyl ether, p-vinylbenzyl glycidyl ether, and compounds containing an alicyclic epoxy skeleton described in paragraphs 0031 to 0035 of JP4168443B. The contents thereof are incorporated in this specification.

Specific examples of the radically polymerizable monomer which is used to form a constitutional unit having an oxetanyl group include (meth)acrylic acid esters having an oxetanyl group described in paragraphs 0011 to 0016 of JP2001-330953A. The contents thereof are incorporated in this specification.

Preferably, specific examples of the radically polymerizable monomer which is used to form the constitutional unit having an epoxy group and/or an oxetanyl group include a monomer containing a methacrylic acid ester structure and a monomer containing an acrylic acid ester structure.

Among these, preferable are glycidyl methacrylate, 3,4-epoxycyclohexylmethyl acrylate, 3,4-epoxycyclohexylmethyl methacrylate, (3-ethyloxetane-3-yl)methyl acrylate, and (3-ethyloxetane-3-yl)methyl methacrylate. These constitutional units can be used alone or in combination of two or more kinds thereof.

Preferably, specific examples of the constitutional unit having an epoxy group and/or an oxetanyl group include the following constitutional units. $R^3$ and $R^4$ are respectively synonymous with $R^3$ and $R^4$ in Formulae (A1) and (A2).

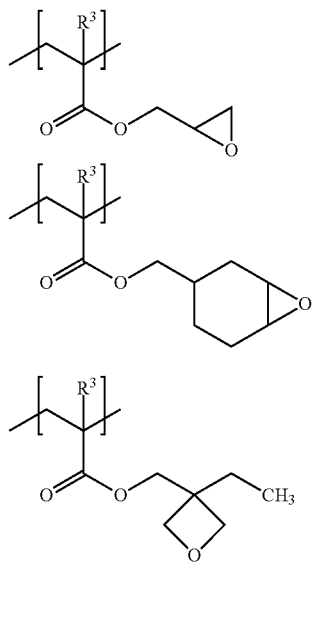

Other examples of the constitutional unit a2 having a crosslinkable group include a constitutional unit having an ethylenically unsaturated group. The constitutional unit having an ethylenically unsaturated group is preferably a constitutional unit having an ethylenically unsaturated group on a side chain, and more preferably a constitutional unit having an ethylenically unsaturated group on a terminal and having a side chain having 3 to 16 carbon atoms.

Regarding the constitutional unit having an ethylenically unsaturated group, the description in paragraphs 0072 to 0090 of JP2011-215580A and the description in paragraphs 0013 to 0031 of JP2008-256974A can be referred to, and the contents thereof are incorporated in this specification.

<Other Constitutional Units>

In the invention, the polymer A may have a constitutional unit other than the constitutional unit a1 and the constitutional unit a2 described above. For example, solvent solubility, heat resistance, reactivity or the like can be increased in a case where the copolymer includes other constitutional units.

Examples of the monomer which forms other constitutional units include an acrylic acid ester compound, a methacrylic acid ester compound, a maleimide compound, an acrylamide compound, acrylonitrile, maleic anhydride, a styrene compound, and a vinyl compound.

<Content>

In the invention, in a case where an organic solvent to be described later is contained, the content of the polymer A is preferably 0.1 to 50 parts by mass, and more preferably 0.5 to 10 parts by mass with respect to 100 parts by mass of the solvent.

[Low-Molecular-Weight Compound B]

The low-molecular-weight compound B contained in the optical alignment film composition according to the invention is a compound having a cinnamate group and having a lower molecular weight than the polymer A.

As described above, in a case where the optical alignment film composition according to the invention contains the low-molecular-weight compound B, an optical alignment film to be produced has improved aligning properties.

In the invention, the molecular weight of the low-molecular-weight compound B is preferably 200 to 500, and more preferably 200 to 400 since the aligning properties are further improved.

Examples of the low-molecular-weight compound B include a compound represented by Formula (B1).

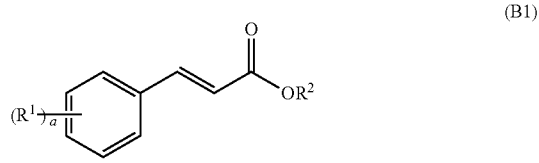

(B1)

Here, in Formula (B1), a represents an integer of 0 to 5, $R^1$ represents a hydrogen atom or a monovalent organic group, and $R^2$ represents a monovalent organic group. In a case where a is 2 or greater, a plurality of $R^1$'s may be the same as or different from each other.

Examples of the monovalent organic group represented by $R^1$ include a chain or cyclic alkyl group having 1 to 20 carbon atoms, an alkoxy group having 1 to 20 carbon atoms, and an aryl group having 6 to 20 carbon atoms which may have a substituent. Among these, an alkoxy group having 1 to 20 carbon atoms is preferable, an alkoxy group having 1 to 6 carbon atoms is more preferable, and a methoxy group or an ethoxy group is even more preferable.

Examples of the monovalent organic group represented by $R^2$ include a chain or cyclic alkyl group having 1 to 20 carbon atoms and an aryl group having 6 to 20 carbon atoms which may have a substituent. Among these, a chain alkyl group having 1 to 20 carbon atoms is preferable, and a branched-chain alkyl group having 1 to 10 carbon atoms is more preferable.

a is preferably 1, and $R^1$ preferably has a at the para-position.

Examples of the optional substituent of the aryl group described above include an alkoxy group, a hydroxy group, a carboxyl group, and an amino group.

Specific examples of the compound represented by Formula (B1) include octyl cinnamate, ethyl-4-isopropylcinnamate, ethyl-2,4-diisopropylcinnamate, methyl-2,4-diisopropylcinnamate, propyl p-methoxycinnamate, isopropyl-p-methoxycinnamate, isoamyl-p-methoxycinnamate, 2-ethylhexyl-p-methoxycinnamate, 2-ethoxyethyl-p-methoxycinnamate, 2-hexyldecanyl-p-methoxycinnamate, and cyclohexyl-p-methoxycinnamate.

<Content>

In the invention, the content of the low-molecular-weight compound B is preferably 10 to 500 mass %, and more preferably 30 to 300 mass % with respect to the mass of the constitutional unit a1 of the polymer A since the aligning properties of an optical alignment film to be produced are further improved.

In a case where an organic solvent to be described later is contained, the content of the low-molecular-weight compound B is preferably 0.01 to 50 parts by mass, and more preferably 0.1 to 10 parts by mass with respect to 100 parts by mass of the solvent.

[Crosslinking Agent C]

The optical alignment film composition according to the invention preferably contains a crosslinking agent C having a crosslinkable group apart from the polymer A having the constitutional unit a2 including a crosslinkable group since the aligning properties are further improved.

The molecular weight of the crosslinking agent C is preferably 1,000 or less, and more preferably 100 to 500.

The crosslinkable group is preferably a thermal crosslinkable group causing a curing reaction by the action of heat.

Examples of the crosslinking agent C include a compound having two or more epoxy groups or oxetanyl groups in the molecule, a blocked isocyanate compound (compound having a protected isocyanate group), and an alkoxymethyl group-containing compound.

Among these, preferable are a compound having two or more epoxy groups or oxetanyl groups in the molecule and a blocked isocyanate compound, and specific examples thereof will be shown as follows.

<Compound Having Two or More Epoxy Groups in Molecule>

Specific examples of the compound having two or more epoxy groups in the molecule include aliphatic epoxy compounds.

These are available as commercially available products. Examples thereof include DENACOL EX-611, EX-612, EX-614, EX-614B, EX-622, EX-512, EX-521, EX-411, EX-421, EX-313, EX-314, EX-321, EX-211, EX-212, EX-810, EX-811, EX-850, EX-851, EX-821, EX-830, EX-832, EX-841, EX-911, EX-941, EX-920, EX-931, EX-212L, EX-214L, EX-216L, EX-321L, EX-850L, DLC-201, DLC-203, DLC-204, DLC-205, DLC-206, DLC-301, and DLC-402 (all manufactured by Nagase ChemteX Corporation), CELLOXIDE 2021P, 2081, and 3000, EHPE3150, EPOLEAD GT400, and CELVENUS B0134 and B0177 (all manufactured by DAICEL CORPORATION).

These can be used alone or in combination of two or more kinds thereof.

<Compound Having Two or More Oxetanyl Groups in Molecule>

Specific examples of the compound having two or more oxetanyl groups in the molecule include ARON OXETANE OXT-121, OXT-221, OX-SQ, and PNOX manufactured by TOAGOSEI CO., LTD.).

<Blocked Isocyanate Compound>

The blocked isocyanate compound is not particularly limited as long as it is a compound having a blocked isocyanate group in which an isocyanate group is chemically protected. From the viewpoint of curability, a compound having two or more blocked isocyanate groups in one molecule is preferable.

In the invention, the blocked isocyanate group is a group capable of generating an isocyanate group by heat, and preferable examples thereof include a group in which an isocyanate group is protected by reacting the isocyanate group with a blocking agent. In addition, the blocked isocyanate group is preferably a group capable of generating an isocyanate group by heat of 90° C. to 250° C.

The skeleton of the blocked isocyanate compound is not particularly limited, and any compound may be used as long as it has two isocyanate groups in one molecule. The blocked isocyanate compound may be an aliphatic, alicyclic, or aromatic polyisocyanate. Examples of the compound which can be suitably used include isocyanate compounds such as 2,4-tolylenediisocyanate, 2,6-tolylenediisocyanate, isophorone diisocyanate, 1,6-hexamethylene diisocyanate, 1,3-trimethylene diisocyanate, 1,4-tetramethylene diisocyanate, 2,2,4-trimethyl hexamethylene diisocyanate, 2,4,4-trimethyl hexamethylene diisocyanate, 1,9-nonamethylene diisocyanate, 1,10-decamethylene diisocyanate, 1,4-cyclohexane diisocyanate, 2,2'-diethylether diisocyanate, diphenylmethane-4,4'-diisocyanate, o-xylene diisocyanate, m-xylene diisocyanate, p-xylene diisocyanate, methylene bis(cyclohexyl isocyanate), cyclohexane-1,3-dimethylene diisocyanate, cyclohexane-1,4-dimethylene diisocyanate, 1,5-naphthalene diisocyanate, p-phenylene diisocyanate, 3,3'-methylene ditolylene-4,4'-diisocyanate, 4,4'-diphenylether diisocyanate, tetrachlorophenylene diisocyanate, norbornane diisocyanate, hydrogenated 1,3-xylylene diisocyanate, and hydrogenated 1,4-xylylene diisocyanate, and compounds having a prepolymer-type skeleton derived from these compounds. Among these, tolylene diisocyanate (TDI), diphenylmethane diisocyanate (MDI), hexamethylene diisocyanate (HDI), and isophorone diisocyanate (IPDI) are particularly preferable.

Examples of the mother structure of the blocked isocyanate compound include et type, an isocyanurate type, an adduct type, and a bifunctional prepolymer type.

Examples of the blocking agent for forming a block structure of the blocked isocyanate compound include an oxime compound, a lactam compound, a phenol compound, an alcohol compound, an amine compound, an active methylene compound, a pyrazole compound, a mercaptan compound, an imidazole-based compound, and an imide-based compound. Of these, a blocking agent selected from an oxime compound, a lactam compound, a phenol compound, an alcohol compound, an amine compound, an active methylene compound, and a pyrazole compound is particularly preferable.

The blocked isocyanate compound is available as a commercially available product. Preferable examples thereof include CORONATE AP STABLE M, CORONAITE 2503, 2515, 2507, 2513, and 2555, and MILLIONATE MS-50 (all manufactured by TOSOH CORPORATION), TAKENATE B-830, B-815N, B-820NSU, B-842N, B-846N, B-870N, B-874N, and B-882N (all manufactured by Mitsui Chemicals, Inc.), DURANATE 17B-60PX, 17B-60P, TPA-B80X, TPA-B80E, MF-B60X, MF-B60B, MF-K60X, MF-K60B, E402-B80B, SBN-70D, SBB-70P, and K6000 (all manufactured by Asahi Kasei Corporation), and DESMODUR BL1100, BL1265 MPA/X, BL3575/1, BL3272MPA, BL3370MPA, BL3475BA/SN, BL5375MPA, VPLS2078/2, BL4265SN, PL340, and PL350, and SUMIDUR BL3175 (all manufactured by Covestro AG).

<Content>

In the invention, in a case where the crosslinking agent C is contained, the content thereof is preferably 1 to 1,000 parts by mass, and more preferably 10 to 500 parts by mass with respect to 100 parts by mass of the constitutional unit a1 of the polymer A.

In a case where the crosslinking agent C is contained and an organic solvent to be described later is contained, the content of the plasticizer is preferably 0.05 to 50 parts by mass, and more preferably 1 to 10 parts by mass with respect to 100 parts by mass of the solvent,

[Organic Solvent]

The optical alignment film composition according to the invention preferably contains an organic solvent from the viewpoint of workability or the like for producing an optical alignment film.

Specific examples of the organic solvent include ketones (for example, acetone, 2-butanone, methyl isobutyl ketone, cyclohexanone, and cyclopentanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethyl acetamide). These may be used alone or in combination of two or more kinds thereof.

[Other Components]

The optical alignment film composition according to the invention may contain other components, and examples thereof include a crosslinking catalyst, an adhesion enhancing agent, a leveling agent, a surfactant, and a plasticizer.

In this specification, the crosslinking catalyst means a compound which has no crosslinking group and is different from the crosslinking agent C.

Examples of the crosslinking catalyst include a thermal acid generator, a photoacid generator, a metallic chelate compound, and a curing accelerator as a component which catalyzes a crosslinking reaction between crosslinkable groups and/or a component which functions to promote a crosslinking reaction between crosslinkable groups in a case where the crosslinking agent C has an epoxy group, an oxetanyl group, a group represented by —NH—CH$_2$—O—R (R represents a hydrogen atom or an alkyl group having 1 to 20 carbon atoms), and/or a blocked isocyanate group.

The thermal acid generator is not particularly limited as long as it is a compound releasing an acid by heat, and examples thereof include known thermal acid generators such as an organic halogenated compound, a disulfonic acid compound, an oxime ester compound, a sulfonic acid ester compound, a phosphoric acid ester compound, a phosphonic acid ester compound, and an onium salt compound such as sulfonium, iodonium, diazonium, pyridinium, phosphonium and ammonium.

The photoacid generator is a compound which is sensitive to active rays with a wavelength of 300 nm or greater, and preferably 300 to 450 nm, and generates an acid, and its chemical structure is not limited. Furthermore, among photoacid generators which are not directly sensitive to active rays with a wavelength of 300 nm or greater, a compound which is sensitive to active rays with a wavelength of 300 nm or greater by being used in combination with a sensitizer and generates an acid can be used. Examples of the photoacid generator include trichloromethyl-s-triazines, sulfonium salt, iodonium salt (onium salt), quaternary ammonium salts, diazomethane compounds, imide sulfonate compounds, and oxime sulfonate compounds. Among these, oxime sulfonate compounds are preferably used from the viewpoint of insulating properties and sensitivity. These photoacid generators can be used alone or in combination of two or more kinds thereof. Specific examples of trichloromethyl-s-triazines, diaryliodonium salts, triarylsulfonium salts, quaternary ammonium salts, and diazomethane derivatives include compounds described in the paragraphs [0083] to [0088] of JP2011-221494A.

As the metallic chelate compound, an acetylacetone complex or an acetoacetic acid complex of at least one metal selected from the group consisting of aluminum, titanium, and zirconium is preferable. Specific examples thereof include: aluminum chelate compounds such as diisopropoxy ethylacetoacetate aluminum, diisopropoxy acetylacetonate aluminum, isopropoxy bis(ethylacetoacetate) aluminum, isopropox bis(acetylacetonate) aluminum, tris(ethylacetoacetate) aluminum, tris(acetylacetonate) aluminum, and monoacetylacetonate bis(ethylacetoacetate) aluminum; titanium chelate compounds such as isopropoxy bis(ethylacetoacetate) titanium and diisopropoxy bis(acetylacetonate) titanium; and zirconium chelate compounds such as tri-n-butoxyethyl acetoacetate zirconium, di-n-butoxy bis(ethylacetoacetate) zirconium, n-butoxy tris(ethylacetoacetate) zirconium, tetrakis(n-propyl acetoacetate) zirconium, tetrakis(acetylacetonate) zirconium, and tetrakis(ethylacetoacetate) zirconium. Regarding the metallic chelate compounds, any one selected from the above compounds can be used alone, or two or more kinds thereof can be used in combination.

As the crosslinking catalyst, a compound having a phenolic group, a silanol group, a thiol group, a phosphate group, a sulfonate group, a carboxyl group, a carboxylic anhydride group, or the like can be used. Among these, a compound having a phenolic group, a silanol group, or a carboxyl group is preferable, and a compound having a phenolic group or a silanol group is more preferable.

Specific examples of the compound having a phenolic group or a silanol group include: crosslinking catalysts having a phenolic group such as cyanophenol, nitrophenol, methoxy phenoxy phenol, thiophenoxy phenol, bis(4-hydroxyphenyl)sulfone, bis(hydroxynaphthyl)sulfone, (3-hydroxyphenyl)(4-hydroxyphenyl)sulfone, phenyl(4-hydroxyphenyl)sulfone, (methoxyphenyl)(4-hydroxyphenyl) sulfone, 4-benzylphenol, and 2,2-bis(4-hydroxyphenyl) propane; and curing accelerators having a silanol group such as trimethylsilanol, triethylsilanol, 1,1,3,3-tetraphenyl-1,3-disiloxanediol, 1,4-bis(hydroxydimethylsilyl)benzene, triphenylsilanol, tri(p-tolyl)silanol, tri(m-trifluoromethylphenyl)silanol, tri(o-trifluoromethylphenyl)silanol, tri(m-fluorophenyl)silanol, tri(o-fluorophenyl)silanol, diphenylsilanediol, and di(o-tolyl)silanediol. Regarding the curing accelerators, any one selected from the above compounds can be used alone, or two or more kinds thereof can be used in combination.

[Optical Alignment Film]

An optical alignment film according to the invention is an optical alignment film which is produced using the optical alignment film composition according to the invention, and has a cyclobutane ring provided by dimerization of the cinnamate groups of the polymer A and the low-molecular-weight compound B included in the optical alignment film composition and/or a structure provided by isomerization of the cinnamate groups.

The thickness of the optical alignment film is not particularly limited, and can be appropriately selected in accordance with the purpose. The thickness is preferably 10 to 1,000 nm, and more preferably 10 to 700 nm.

[Manufacturing Method]

The optical alignment film according to the invention can be manufactured by a manufacturing method which has been known, except that the above-described optical alignment film composition according to the invention is used. For example, the optical alignment film can be manufactured by a manufacturing method having a coating step of coating the above-described optical alignment film composition according to the invention on a surface of a support and a light irradiation step of irradiating a surface of the coating film of the optical alignment film composition with polarized or unpolarized tight in an oblique direction.

The support will be described in the description of an optical laminate according to the invention to be described later.

<Coating Step>

In the coating step, the coating method is not particularly limited, and can be appropriately selected in accordance with the purpose. Examples thereof include spin coating, die coating, gravure coating, flexographic printing, and inkjet printing.

<Light Irradiation Step>

In the light irradiation step, the polarized light which is irradiated on the coating film of the optical alignment film composition is not particularly limited. Examples thereof include linearly polarized light, circularly polarized light, and elliptically polarized light, and among these, linearly polarized light is preferable.

The "oblique direction" in which irradiation with unpolarized light is performed is not particularly limited as long as it is a direction inclined at a polar angle $\theta$ ($0°<\theta<90°$) with respect to a normal direction of the surface of the coating film. $\theta$ can be appropriately selected in accordance with the purpose, and is preferably 20° to 80°.

The wavelength of polarized light or unpolarized light is not particularly limited as long as a capability of controlling alignment of liquid crystalline molecules can be imparted to the coating film of the optical alignment film composition. For example, ultraviolet rays, near-ultraviolet rays, visible rays, or the like are used. Among these, near-ultraviolet rays with a wavelength of 250 nm to 450 nm are particularly preferable.

Examples of the light source for the irradiation with polarized light or unpolarized light include a xenon lamp, a high-pressure mercury lamp, an extra-high-pressure mercury lamp, and a metal halide lamp. By using an interference filter, a color filter, or the like with respect to ultraviolet rays or visible rays obtained from the light source, the wavelength range of the irradiation can be restricted. In addition, linearly polarized light can be obtained by using a polarization filter or a polarization prism with respect to the light from the light source.

The integrated light quantity of polarized light or unpolarized light is not particularly limited as long as a capability of controlling alignment of liquid crystalline molecules can be imparted to the coating film of the optical alignment film composition. The integrated light quantity is preferably 1 to 300 mJ/cm$^2$, and more preferably 5 to 100 mJ/cm$^2$.

The illuminance of polarized light or unpolarized light is not particularly limited as long as a capability of controlling alignment of liquid crystalline molecules can be imparted to the coating film of the optical alignment film composition. The illuminance is preferably 0.1 to 300 mW/cm$^2$, and more preferably 1 to 100 mW/cm$^2$.

[Optical Laminate]

An optical laminate according to the invention is an optical laminate which has the above-described optical alignment film according to the invention and an optical anisotropic layer provided on the optical alignment film and containing a liquid crystal compound.

The optical laminate according to the invention preferably further has a support. Specifically, the optical laminate preferably has the support, the optical alignment film, and the optical anisotropic layer in this order.

In a case where the support is included in the above-described order, the optical laminate according to the invention preferably has a resin layer between the support and the optical alignment film. Furthermore, the optical laminate preferably has another optical anisotropic layer between the resin layer and the optical alignment film.

FIGS. 1A to 1G are cross-sectional views each schematically illustrating an example of the optical laminate according to the invention. FIGS. 1A to 1G are all schematic views, and the relationships between the thicknesses of the respective layer and the like are not exactly coincident with the actual relationships.

An optical laminate 10 illustrated in FIG. 1A has an optical alignment film 1 and an optical anisotropic layer 2 in this order.

Figure 1B:
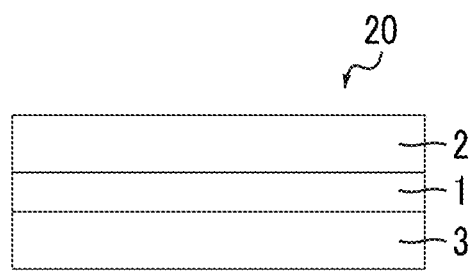
FIG. 1B is a cross-sectional view schematically illustrating an example of the optical laminate according to the invention.

An optical laminate 20 illustrated in FIG. 1B has a support 3, an optical alignment film 1, and an optical anisotropic layer 2 in this order.

Figure 1C:
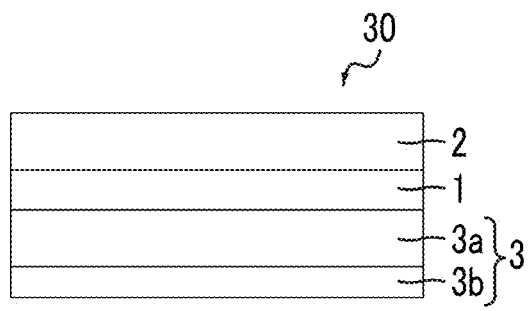
FIG. 1C is a cross-sectional view schematically illustrating an example of the optical laminate according to the invention.

An optical laminate 30 illustrated in FIG. 1C has a polymer film 3b, a polarizer 3a, an optical alignment film 1, and an optical anisotropic layer 2 in this order.

Figure 1D:
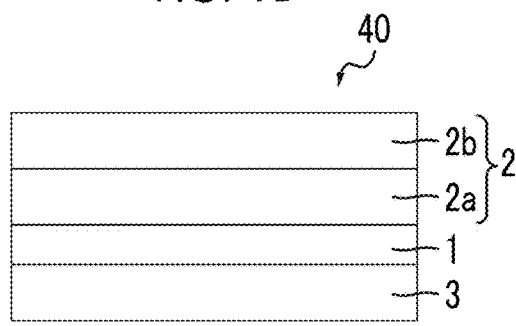
FIG. 1D is a cross-sectional view schematically illustrating an example of the optical laminate according to the invention.

An optical laminate 40 illustrated in FIG. 1D has a support 3, an optical alignment film 1, a first optical anisotropic layer 2a, and a second optical anisotropic layer 2b in this order.

Figure 1E:
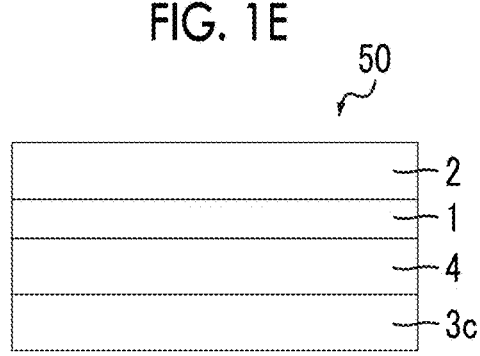
FIG. 1E is a cross-sectional view schematically illustrating an example of the optical laminate according to the invention.

An optical laminate 50 illustrated in FIG. 1E has a temporary support 3c, a resin layer 4, an optical alignment film 1, and an optical anisotropic layer 2 in this order.

Figure 1F:
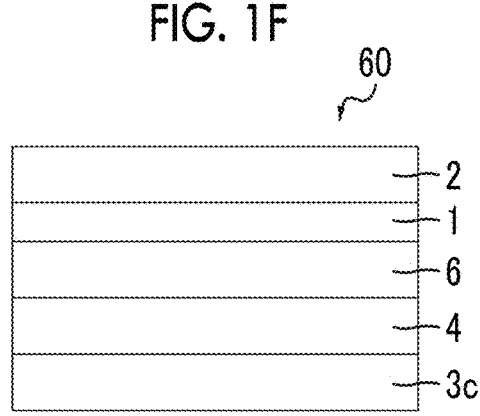
FIG. 1F is a cross-sectional view schematically illustrating an example of the optical laminate according to the invention.

An optical laminate 60 illustrated in FIG. 1F has a temporary support 3c, a resin layer 4, another optical anisotropic layer 6, an optical alignment film 1, and an optical anisotropic layer 2 in this order.

Figure 1G:
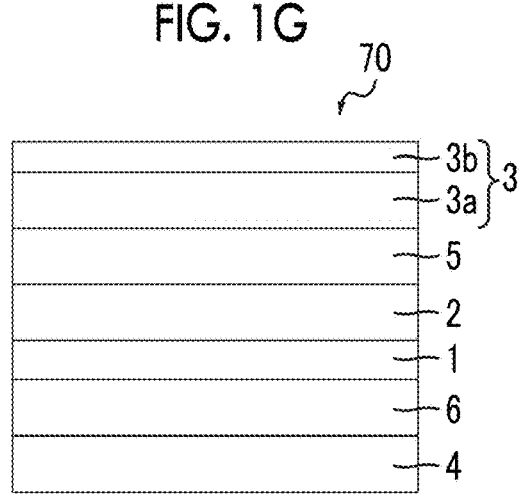
FIG. 1G is a cross-sectional view schematically illustrating an example of the optical laminate according to the invention.

An optical laminate 70 illustrated in FIG. 1G has a resin layer 4, another optical anisotropic layer 6, an optical alignment film 1, an optical anisotropic layer 2, an adhesive layer or pressure sensitive adhesive layer 5, a polarizer 3a, and a polymer film 3b in this order.

[Optical Anisotropic Layer]

The optical anisotropic layer of the optical laminate according to the invention is not particularly limited as long as it is an optical anisotropic layer containing a liquid crystal compound. An optical anisotropic layer which has been known can be appropriately employed and used.

Such an optical anisotropic layer is preferably a layer obtained by curing a composition containing a liquid crystal compound having a polymerizable group (hereinafter, also referred to as "optical anisotropic layer forming composition"). The optical anisotropic layer may have a single layer structure or a structure including a lamination of a plurality of layers as illustrated in FIG. 1D (laminate).

Hereinafter, a liquid crystal compound and predetermined additives contained in the optical anisotropic layer forming composition will be described.

<Liquid Crystal Compound>

The liquid crystal compound contained in the optical anisotropic layer forming composition is a liquid crystal compound having a polymerizable group.

In general, liquid crystal compounds can be classified into a rod-like type and a disk-like type according to the shape thereof. Further, each type includes a low molecular type and a high molecular type. The term high molecular generally refers to a compound having a degree of polymerization of 100 or greater (Polymer Physics-Phase Transition Dynamics, written by Masao Doi, p. 2, published by Iwanami Shoten, 1992).

In the invention, any type of liquid crystal compound can be used, but a rod-like liquid crystal compound or a discotic liquid crystal compound is preferably used, and a rod-like liquid crystal compound is more preferably used.

In the invention, in order to fix the above-described liquid crystal compound, a liquid crystal compound having a polymerizable group is used, and it is preferable that the liquid crystal compound has two or more polymerizable groups in one molecule. In a case where a mixture of two or more kinds of liquid crystal compounds is used, at least one liquid crystal compound preferably has two or more polymerizable groups in one molecule. After the fixing of the liquid crystal compound by polymerization, it is not necessary for the compound to exhibit crystallinity.

The kind of the polymerizable group is not particularly limited. A functional group allowing an addition polymerization reaction is preferable, and a polymerizable ethylenically unsaturated group or a ring-opening polymerizable group is more preferable. More specifically, preferable examples thereof include a (meth)acryloyl group, a vinyl group, a styryl group, and an allyl group, and a (meth)acryloyl group is more preferable. A (meth)acryloyl group means both of a methacryloyl group and an acryloyl group.

As the rod-like liquid crystal compound, for example, those described in claim 1 of JP1999-513019A (JP-H-513019A) or paragraphs [0026] to [0098] of JP2005-289980A can be preferably used, and as the discotic liquid crystal compound, for example, those described in paragraphs [0020] to [0067] of JP2007-108732A or paragraphs [0013] to [0108] of JP2010-244038A can be preferably used, but the liquid crystal compounds are not limited thereto.

<Additives>

The optical anisotropic layer forming composition may include a compound other than the above-described liquid crystal compound.

For example, the optical anisotropic layer-forming composition may include a polymerization initiator. A polymerization initiator to be used is selected in accordance with the form of the polymerization reaction, and examples thereof include a thermal polymerization initiator and a photopolymerization initiator. Examples of the photopolymerization initiator include α-carbonyl compound, acyloin ether, α-hydrocarbon-substituted aromatic acyloin compound, polynuclear quinone compound, and combination of triaryl imidazole dimer and p-aminophenyl ketone.

The amount of the polymerization initiator to be used is preferably 0.01 to 20 mass %, and more preferably 0.5 to 5 mass % with respect to the total solid content of the composition.

The optical anisotropic layer forming composition may contain a polymerizable monomer in view of the uniformity of the coating film and the hardness of the film.

Examples of the polymerizable monomer include a radical polymerizable or cation polymerizable compound. A polyfunctional radical polymerizable monomer is preferable, and the polymerizable monomer is more preferably copolymerizable with the above-described liquid crystal compound containing a polymerizable group. Examples thereof include those described in paragraphs [0018] to [0020] of JP2002-296423A.

The content of the polymerizable monomer is preferably 1 to 50 mass %, and more preferably 2 to 30 mass % with respect to the total mass of the liquid crystal compound.

The optical anisotropic layer forming composition may contain a surfactant in view of the uniformity of the coating film and the hardness of the film.

Examples of the surfactant include compounds which have been known, and a fluorine-based compound is particularly preferable. Specific examples thereof include compounds described in paragraphs [0028] to [0056] of JP2001-330725A and compounds described in paragraphs [0069] to [0126] of JP2003-295212.

The optical anisotropic layer forming composition may contain an organic solvent. Examples of the organic solvent include those described in the above description of the optical alignment film composition according to the invention.

The optical anisotropic layer forming composition may contain various alignment agents such as vertical alignment accelerators, e.g., polarizer interface-side vertical alignment agents and air interface-side vertical alignment agents, and horizontal alignment accelerators, e.g., polarizer interface-side horizontal alignment agents and air interface-side horizontal alignment agents.

The optical anisotropic layer forming composition may further contain an adhesion enhancing agent, a plasticizer, a polymer, or the like other than the above-described components.

The method of forming an optical anisotropic layer using an optical anisotropic layer forming composition having the above components is not particularly limited. For example, a coating film may be formed by coating an optical anisotropic layer forming composition on the above-described optical alignment film according to the invention, and the obtained coating film may be subjected to a curing treatment (irradiation with ultraviolet rays (light irradiation treatment) or heating treatment) to form an optical anisotropic layer.

The coating with the optical anisotropic layer forming composition is performed by a known method (for example, wire bar coating method, extrusion coating method, direct gravure coating method, reverse gravure coating method, or die coating method).

In the invention, the thickness of the optical anisotropic layer is not particularly limited. The thickness is preferably 0.1 to 10 μm, and more preferably 0.5 to 5 μm.

In the invention, in a case where the optical anisotropic layer is allowed to function as a positive A-plate, the optical anisotropic layer is preferably an optical anisotropic layer in which a rod-like liquid crystal compound is subjected to homogeneous (horizontal) alignment since it is useful in optical compensation in a liquid crystal display device, such as an in-plane-switching (IPS) mode liquid crystal display device, in which a pre-tilt angle of a driving liquid crystal is not required.

In addition, since the optical compensation in an IPS mode liquid crystal display device is further improved, the optical anisotropic layer preferably has a structure having a first optical anisotropic layer in which a rod-like liquid crystal compound is subjected to homogeneous (horizontal) alignment and a second optical anisotropic layer in which a rod-like liquid crystal compound is subjected to homeotropic (vertical) alignment among structures including a lamination of a plurality of layers as illustrated in FIG. 1D.

Furthermore, in the invention, since the aligning properties of the optical anisotropic layer are further improved, the optical anisotropic layer is preferably a layer which is obtained by aligning the above-described optical anisotropic layer forming composition in a smectic phase and by then polymerizing the composition (fixing of the alignment).

The optical anisotropic layer of the optical laminate according to the invention preferably satisfies Formula (II) or (III) from the viewpoint of imparting excellent view angle characteristics.

$$0.75 < Re(450)/Re(550) < 1.00 \quad \text{(II)}$$

$$0.75 < Rth(450)/Rth(550) < 1.02 \quad \text{(III)}$$

Here, in Formula (II), Re (450) represents an in-plane retardation of the optical anisotropic layer at a wavelength of 450 nm, and Re (550) represents an in-plane retardation of the optical anisotropic layer at a wavelength of 550 nm. In Formula (III), Rth (450) represents a retardation in a thickness direction of the optical anisotropic layer at a wavelength of 450 nm, and Rth (550) represents a retardation in a thickness direction of the optical anisotropic layer at a wavelength of 550 nm.

The value of the in-plane retardation and the value of the retardation in a thickness direction refer to values measured using light with a measurement wavelength with the use of AxoScan OPMF-1 (manufactured by Opto Science, Inc.).

[Other Optical Anisotropic Layers]

The optical laminate according to the invention preferably has another optical anisotropic layer different from the above-described optical anisotropic layer between a resin layer to be described later and the above-described optical alignment film.

Another optical anisotropic layer is not particularly limited, and a known optical anisotropic layer can be used. Another optical anisotropic layer preferably contains a liquid crystal compound, and is more preferably a layer obtained by curing an optical anisotropic layer forming composition.

The liquid crystal compound and the optical anisotropic layer forming composition are not particularly limited, and for example, the liquid crystal compound contained in the optical anisotropic layer and the optical anisotropic layer forming composition, which have been described above, may be used. Another optical anisotropic layer also preferably satisfies Formula (II) or (III) from the viewpoint of imparting excellent view angle characteristics.

In addition, since the optical compensation in an in-plane-switching (IPS) mode liquid crystal display device is further improved, another optical anisotropic layer preferably has a structure having the optical anisotropic layer in which a rod-like liquid crystal compound is subjected to homogeneous (horizontal) alignment and the another optical anisotropic layer in which a rod-like liquid crystal compound is subjected to homeotropic (vertical) alignment among structures including a lamination of a plurality of layers as illustrated in FIG. 1F.

[Resin Layer]

A predetermined resin layer which is used in the optical laminate according to the invention is preferably a layer obtained by polymerizing and curing two or more kinds of polyfunctional monomers, The polymerizable group contained in the polyfunctional monomer is more preferably a (meth)acryloyl group. At least one of the two or more kinds of polyfunctional monomers is preferably a monomer having a partial structure represented by Formula (X) (hereinafter, also referred to as "tricyclodecane skeleton"). Using a resin layer obtained by polymerizing and curing a monomer having a tricyclodecane skeleton represented by Formula (X) and a polyfunctional monomer, the adhesion with a temporary support to be described later can be reduced while maintaining film hardness of the resin layer, and thus the optical anisotropic layer can be easily transferred to a polarizer.

Hereinafter, raw materials of the resin layer will be described in detail, and procedures for manufacturing the resin layer will be described in detail.

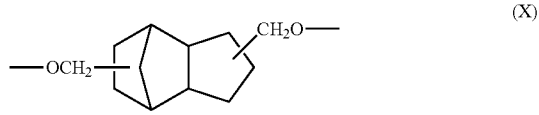
(X)

<Polyfunctional Monomer>

The polyfunctional monomer is a compound which can be polymerized using light or heat, and is a component constituting the resin layer by being polymerized and cured.

The polyfunctional monomer includes a plurality of polymerizable groups. The polymerizable group is defined as described above, and is preferably a (meth)acryloyl group.

The number of polymerizable groups included in the polyfunctional monomer is not particularly limited and may be more than one (two or more). The number of polymerizable groups is preferably 3 to 32, and more preferably 3 to 20 in view of excellent film hardness of the resin layer.

Specific examples of the polyfunctional monomer include polyfunctional (meth)acrylates obtained by performing (meth)acrylation after an addition reaction of an ethylene oxide or a propylene oxide with a polyfunctional alcohol such as ethylene glycol di(meth)acrylate, triethylene glycol di(meth)acrylate, tetramethylene glycol di(meth)acrylate, propylene glycol di(meth)acrylate, polyethylene glycol di(meth)acrylate, polypropylene glycol di(meth)acrylate, 1,3-butanediol di(meth)acrylate, trimethylol ethane triacrylate, trimethylol propane tri(meth)acrylate, trimethylol propane di(meth)acrylate, neopentyl glycol di(meth)acrylate, pentaerythritol tetra(meth)acrylate, pentaerythritol tri(meth)acrylate, pentaerythritol hexa(meth)acrylate, dipentaerythritol hexa(meth)acrylate, dipentaerythritol penta(meth)acrylate, 1,4-hexanediol (meth)acrylate, hexanediol di(meth)acrylate, trimethylol propane tri(acryloyloxypropyl)ether, tri(acryloyloxyethyl) isocyanurate, tri(acryloyloxyethyl) cyanurate, glycerin tri(meth)acrylate, trimethylol propane, or glycerin.

These polyfunctional monomers may be used alone or in combination of two or more kinds thereof.

The (meth)acrylate means acrylate or methacrylate.

A composition for forming the resin layer (hereinafter, also referred to as "resin layer forming composition") may contain a surfactant other than the polyfunctional monomer in view of the uniformity of the coating film and the hardness of the film. Examples of the surfactant include those described in the above description of the optical anisotropic layer forming composition.

The resin layer forming composition may contain an organic solvent. Examples of the organic solvent include those described in the above description of the optical alignment film composition according to the invention.

The resin layer forming composition may further contain an adhesion enhancing agent, a plasticizer, a polymer, or the like other than the above-described components.

The method of forming a resin layer is not particularly limited. For example, a coating film may be formed by coating with a resin layer forming composition, and the obtained coating film may be subjected to a curing treatment. (irradiation with ultraviolet rays (light irradiation treatment) or heating treatment) to form a resin layer. Examples of the coating with the resin layer forming composition include those described in the above description of the optical anisotropic layer thrilling composition used in the invention.

In the invention, the thickness of the resin layer is not particularly limited. The thickness is preferably 0.5 to 5 µm, and more preferably 0.5 to 2 µm.

[Support]

The optical laminate according to the invention may have a support as a base for forming the optical anisotropic layer as described above.

Examples of such a support include a polarizer and a polymer film, and further include a combination thereof, such as a laminate of a polarizer and a polymer film and a laminate of a polymer film, a polarizer, and a polymer film.

The support may be a temporary support which is peelable after formation of the optical anisotropic layer (hereinafter, may be simply referred to as "temporary support"). Specifically, a polymer film functioning as a temporary support may be peeled off from the optical laminate to provide the optical anisotropic layer. For example, an optical laminate including an optical anisotropic layer and a temporary support may be prepared, the optical anisotropic layer side of the optical laminate may be bonded to a support including a polarizer with a pressure sensitive adhesive or an adhesive, and then the temporary support included in the optical anisotropic layer may be peeled off to provide a laminate of the support including a polarizer and the optical anisotropic layer.

<Polarizer>

In the invention, in a case where the optical laminate according to the invention is used in an image display device, at least a polarizer is preferably used as a support.

The polarizer is not particularly limited as long as it is a member functioning to convert light into specific linearly polarized light. An absorption-type polarizer or a reflection-type polarizer which has been known can be used.

As the absorption-type polarizer, an iodine-based polarizer, a dye-based polarizer using a dichroic dye, a polyene-based polarizer, or the like is used. The iodine-based polarizer and the dye-based polarizer include a coating-type polarizer and a stretching-type polarizer, and any of these may be applicable. A polarizer produced by adsorbing iodine or a dichroic dye to polyvinyl alcohol and performing stretching is preferable.

Examples of the method of obtaining a polarizer by performing stretching and dyeing in a state in which a lamination film is obtained by forming a polyvinyl alcohol layer on a base include JP5048120B, JP5143918B, JP5048120B, JP4691205B, JP4751481B, and JP4751486B. These known technologies concerning a polarizer can also be preferably used.

As the reflection-type polarizer, a polarizer obtained by laminating thin films having different birefringences, a wire grid-type polarizer, a polarizer obtained by combining a cholesteric liquid crystal having a selective reflection area and a ¼ wavelength plate, or the like is used.

Among these, a polarizer including a polyvinyl alcohol-based resin (that means a polymer including $—CH_2—CHOH—$ as a repeating unit. Particularly, at least one selected from the group consisting of polyvinyl alcohol and ethylene-vinyl alcohol copolymer is preferable) is preferable in view of handleability.

In an aspect in which the optical laminate according to the invention includes a peelable support, a polarizing plate can be manufactured as follows.

The support is peeled off from the above-described optical laminate, and a layer including an optical anisotropic layer is laminated on a support including a polarizer. Otherwise, the above-described optical laminate is laminated on a support including a polarizer, and then the peelable support included in the optical laminate is peeled off. During the lamination, both layers may be adhered using an adhesive or the like. The adhesive is not particularly limited, and examples thereof include a curable adhesive of an epoxy compound including no aromatic ring in the molecule as shown in JP2004-245925A, an active energy ray-curable adhesive containing, as essential components, a photopolymerization initiator having a molar absorption coefficient of 400 or greater at a wavelength of 360 to 450 nm and an ultraviolet-curable compound as described in JP2008-174667A, and an active energy ray-curable adhesive containing (a) (meth)acrylic compound having two or more (meth)acryloyl groups in the molecule, (b) (meth)acrylic compound having a hydroxyl group in the molecule and having only one polymerizable double bond, and (c) phenol ethylene oxide-modified acrylate or nonyl phenol ethylene oxide-modified acrylate in a total amount of 100 parts by mass of a (meth)acrylic compound as described in JP2008-174667A.

The thickness of the polarizer is not particularly limited. The thickness is preferably 1 to 60 λm, more preferably 1 to 30 μm, and even more preferably 2 to 20 μm.

<Polymer Film>

The polymer film is not particularly limited, and a polymer film which is generally used (for example, polarizer protective film) can be used.

Specific examples of the polymer constituting the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

Among these, cellulose-based polymers (hereinafter, also referred to as "cellulose acylate") represented by triacetyl cellulose can be preferably used.

From the viewpoint of workability and optical performance, acrylic polymers are also preferably used.

Examples of the acrylic polymers include polymethyl methacrylate and lactone ring-containing polymers described in paragraphs [0017] to [0107] of JP2009-98605A.

The thickness of the polymer film which is used as a polarizer protective film or the like is not particularly limited, and preferably 40 μm or less since the thickness of the optical laminate can be reduced. The lower limit is not particularly limited, and generally 5 μm or greater.

In an aspect in which a polymer film is used as a support which is not peeled off from the optical laminate, the glass transition temperature of the support is preferably lower than 100° C. since superiority of using the optical alignment film composition according to the invention increases.

Here, in this specification, 20 mg of a support sample was put into a measurement pan and held for 1.5 minutes after temperature increase from 30° C. to 120° C. at a rate of 10° C./min in a nitrogen gas flow, and then the temperature was reduced to 30° C. at −20° C./min in a differential scanning calorimeter (X-DSC7000 (manufactured by SEIKO INSTRUMENTS INC.)). Then, the temperature was increased again from 30° C. to 250° C., and a temperature at which the baseline starts to change from the low temperature side is defined as a glass transition temperature Tg.

In the invention, the thickness of the support is not particularly limited. The thickness is preferably 1 to 100 μm, more preferably 5 to 50 μm, and even more preferably 5 to 20 μm. In a case where the polarizer and the polymer film are all included, the thickness of the support refers to a total of thicknesses of the polarizer and the polymer film.

In an aspect in which a polymer film is used as the support which is peelable from the optical laminate, a cellulose-based polymer or a polyester-based polymer can be preferably used. The thickness of the polymer film is not particularly limited. The thickness is preferably 5 μm to 100 μm, and more preferably 20 μm to 90 μm due to handling during the manufacturing.

[Image Display Device]

An image display device according to the invention is an image display device having the optical laminate according to the invention.

The display element which is used in the image display device according to the invention is not particularly limited, and examples thereof include a liquid crystal cell, an organic electroluminescence (hereinafter, electroluminescence "EL") display panel, and a plasma display panel.

Among these, a liquid crystal cell or an organic EL display panel is preferable, and a liquid crystal cell is more preferable. That is, the image display device according to the invention is preferably a liquid crystal display device using a liquid crystal cell as a display element or an organic EL display device using an organic EL display panel as a display element, and more preferably a liquid crystal display device.

[Liquid Crystal Display Device]

A liquid crystal display device as an example of the image display device according to the invention is a liquid crystal display device having the above-described optical laminate according to the invention and a liquid crystal cell.

In the invention, the optical laminate according to the invention is preferably used as a front-side polarizing plate among polarizing plates provided on both sides of the liquid crystal cell.

Hereinafter, the liquid crystal cell constituting the liquid crystal display device will be described in detail.

<Liquid Crystal Cell>

The liquid crystal cell which is used in the liquid crystal display device is preferably a vertical alignment (VA) mode, an optically compensated bend (OCR) mode, an in-plane-switching (IPS) mode, or a twisted nematic (TN) mode, but is not limited thereto.

In a TN mode liquid crystal cell, rod-like liquid crystalline molecules (rod-like liquid crystal compound) are substantially horizontally aligned with no voltage application thereto, and subjected to twist alignment of 60° to 120°. The TN mode liquid crystal cell is the most frequently used as a color TFT liquid crystal display device, and there are descriptions in many literatures.

In a VA mode liquid crystal cell, rod-like liquid crystalline molecules are substantially vertically aligned with no voltage application thereto. The VA mode liquid crystal cell may be any one of (1) a VA mode liquid crystal cell in the narrow sense in which rod-like liquid crystalline molecules are substantially vertically aligned with no voltage application thereto, but are substantially horizontally aligned in the presence of voltage application thereto (described in JP1990-176625A (JP-H2-176625A)); (2) a (multi-domain vertical alignment (MVA) mode) liquid crystal cell attaining multi-domain of the VA mode for view angle enlargement (described in SID97, Digest of tech. Papers (proceedings) 28 (1997), 845), (3) an (n-axially symmetric aligned microcell (ASM) mode) liquid crystal cell in which rod-like liquid crystalline molecules are substantially vertically aligned with no voltage application thereto, but are subjected to twist multi-domain alignment in the presence of voltage application thereto (described in proceedings of Japan Liquid Crystal Debating Society, 58 to 59 (1998)), and (4) a super ranged viewing by vertical alignment (SURVIVAL) mode liquid crystal cell (published in liquid crystal display (LCD) International 98). In addition, the VA mode liquid crystal cell may be any one of a patterned vertical alignment (PVA) type, an optical alignment type, and a polymer-sustained alignment (PSA) type. The details of the modes are described in JP2006-215326A and JP2008-538819A.

In an IPS mode liquid crystal cell, rod-like liquid crystalline molecules are aligned to be substantially parallel to the substrate. The liquid crystalline molecules planarly respond by the application of an electric field parallel to a substrate surface. In the IPS mode, black display is performed during application of no electric field, and the absorption axes of a pair of upper and lower polarizing plates are perpendicular to each other. A method of improving a view angle by reducing light leakage at the time of black display in an oblique direction by using an optical compensation sheet is disclosed in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

EXAMPLES

Hereinafter, the invention will be more specifically described based on examples. Materials, used amounts, ratios, treatment contents, treatment procedures, and the like of the following examples are able to be suitably changed unless the changes cause deviance from the gist of the invention. Therefore, the range of the invention will not be restrictively interpreted by the following examples.

[Polymer A 1]

1 part by mass of 2,2'-azobis(isobutyronitrile) as a polymerization initiator and 180 parts by mass of diethylene glycol methyl ethyl ether as a solvent were put into a flask provided with a cooling pipe and a stirrer. 100 parts by mass of 3,4-epoxycyclohexylmethyl methacrylate was added thereto, nitrogen substitution was performed in the flask, and then the materials were gently stirred. The solution temperature was increased to 80° C. and maintained for 5 hours, and thus a polymer solution containing approximately 35 mass % of polymethacrylate having an epoxy group was obtained. The weight average molecular weight Mw of the obtained epoxy-containing polymethacrylate was 25,000.

Next, 286 parts by mass of a solution containing the epoxy-containing polymethacrylate obtained as described above (100 parts by mass in terms of polymethacrylate), 120 parts by mass of a cinnamic acid derivative obtained by the method of Synthesis Example 1 of JP2015-26050A, 2.0 parts by mass of tetrabutylammonium bromide as a catalyst, and 150 parts by mass of propylene glycol monomethyl ether acetate as a solvent for dilution were put into another reaction container, and a reaction was caused under stirring for 12 hours at 90° C. in a nitrogen atmosphere. After the reaction was terminated, 100 parts by mass of propylene glycol monomethyl ether acetate was added to the reaction mixture to dilute the reaction mixture, and the resulting material was water-washed three times. The organic phase after the water washing was charged into a large excess of methanol to precipitate a polymer, and the recovered precipitate was vacuum-dried for 12 hours at 40° C. to obtain the following polymer A1 having an optical aligning group.

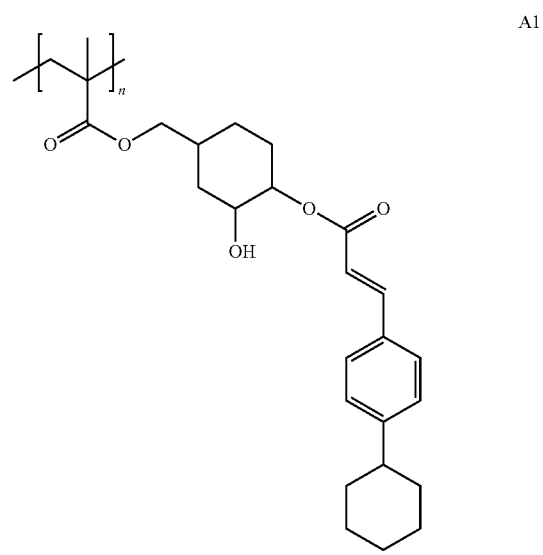

A1

[Polymer A2]

100.0 parts by mass of 2-(3,4-epoxycyclohexyl)ethyltrimethoxysilane, 500 parts by mass of methyl isobutyl ketone, and 10.0 parts by mass of triethylamine were put into a reaction container provided with a stirrer, a thermometer, a drip funnel, and a reflux cooling pipe, and mixed at room temperature. Next, 100 parts by mass of deionized water was added dropwise for 30 minutes from the drip funnel, and then the mixture was reacted for 6 hours at 80° C. while mixing under reflux. After the reaction was terminated, the organic phase was taken out and washed with a 0.2 mass % aqueous solution of ammonium nitrate until the water after the washing was neutral. Then, the solvent and the water were removed by distillation under reduced pressure, and thus epoxy-containing polyorganosiloxane was obtained as a viscous transparent liquid.

The epoxy-containing polyorganosiloxane was subjected to $^1$H-nuclear magnetic resonance (NMR) analysis. An oxiranyl group-based peak was obtained near chemical shift (δ) of 3.2 ppm in accordance with theoretical strength, and it was confirmed that no side reactions of the epoxy group occurred during the reaction. The weight average molecular weight Mw of the epoxy-containing polyorganosiloxane was 2,200, and the epoxy equivalent was 186 g/mol.

Next, 10.1 parts by mass of the epoxy-containing polyorganosiloxane obtained as described above, 0.5 parts by mass of an acryloyl group-containing carboxylic acid (TOAGOSEI CO., LTD., trade name "ARONIX M-5300", ω-carboxy-polycaprolactone acrylate (polymerization degree n≈2)), 20 parts by mass of butyl acetate, 1.5 parts by mass of a cinnamic acid derivative obtained by the method of Synthesis Example 1 of JP2015-26050A, and 0.3 parts by mass of tetrabutylammonium bromide were put into a 100 mL three-necked flask and stirred for 12 hours at 90° C. After the reaction was terminated, the reaction solution was diluted with the same amount (mass) of butyl acetate, and water washing was performed three times. Concentrating and diluting the solution with butyl acetate were repeated two times, and finally, a solution containing polyorganosiloxane having an optical aligning group (the following polymer A2) was obtained. The weight average molecular weight Mw of the polymer A2 was 9,000. In addition, as a result of $^1$H-NMR analysis, the component having a cinnamate group in the polymer A2 was 23.7 mass %.

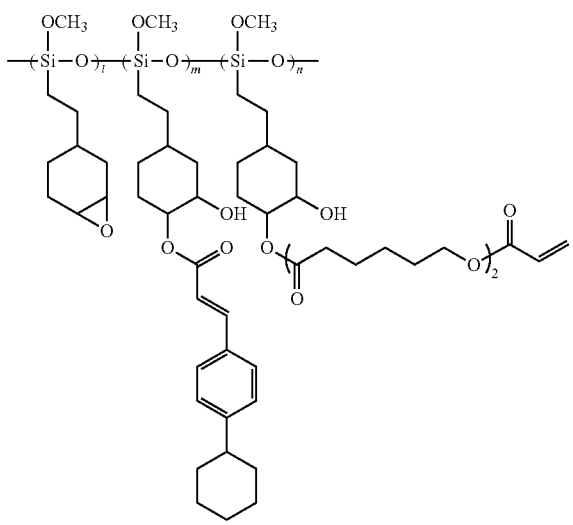

A2

[Polymer A3]

A polymer A3 was obtained in the same manner as in the case of the polymer A2, except that the amounts of the acryloyl group-containing carboxylic acid and the cinnamic acid derivative to be added were changed in the production of the polymer A2. The weight average molecular weight Mw of the polymer A3 was 10,000. As a result of $^1$H-NMR analysis, the component having a cinnamate group in the polymer A3 was 47.9 mass %.

[Polymer A4]

7 parts by mass of 2,2'-azobis(2,4-dimethylvaleronitrile), 3 parts by mass of α-methyl styrene dimer, and 220 parts by mass of diethylene glycol methyl ethyl ether were put into a flask provided with a cooling pipe and a stirrer. Next, 100 parts by mass of epoxycyclohexylmethyl methacrylate (DAICEL CORPORATION, trade name "CYCLOMER M100") was put thereinto, and nitrogen substitution was performed. Then, the materials were gently heated and stirred. The temperature of the solution was increased to 70° C. and maintained for 5 hours, and thus a polymer solution containing a polymer was obtained. The obtained polymer solution was added dropwise to hexane for reprecipitation, and the precipitate was recovered by filtration, and then dried to obtain a white powder of epoxy-containing polymethacrylate. The weight average molecular weight Mw of the obtained epoxy-containing polymethacrylate was 11,000.

Next, 5.1 parts by mass of the epoxy-containing polymethacrylate obtained as described above, 8.4 parts by mass of an acryloyl group-containing carboxylic acid (TOAGOSEI CO., LTD., trade name "ARONIX M-5300", ω-carboxy-polycaprolactone acrylate (polymerization degree n≈2)), 32 parts by mass of methyl isobutyl ketone, and 0.3 parts by mass of tetrabutylammonium bromide were put into a 100 mL three-necked flask and stirred for 12 hours at 90° C. After the reaction was terminated, reprecipitation was performed with methanol. The precipitate was dissolved in ethyl acetate to obtain a solution, and water washing was performed three times. Concentrating and diluting the solution with ethyl acetate were repeated two times, and finally, a white powder of a polymethacrylate copolymer having an acrylate group and an epoxy group on a side chain was obtained. The weight average molecular weight Mw of the polymethacrylate copolymer was 8,000.

[Polymer A5]

A polymer A5 was obtained by mixing 5 parts by mass of the polymer A3 and 5 parts by mass of the polymer A4.

[Low-Molecular-Weight Compound B1]

Methoxy cinnamate (3.56 g, 20 mmol), 2-hexyl-1-decanol (4.8 g, 20 mmol), and dimethylaminopyridine (0.2 g, 2 mmol) were dissolved in 30 ml of tetrahydrofuran (hereinafter, abbreviated as "THF") and stirred at 0° C.

To the TI-IF solution, dicyclohexylcarbodiimide (4.126 g, 20 mmol) was added, and the mixture was stirred for 6 hours at room temperature.

Next, the THF was removed by distillation, and then 150 ml of ethyl acetate was added thereto, and the precipitated solid was removed by filtering. After washing with 30 ml of ethyl acetate, the ethyl acetate contained in the filtrate was removed by distillation, and 8 g of crude was obtained. The crude was isolated and purified by silica gel column (hexane/ethyl acetate=3/1), and a low-molecular-weight compound B1 represented by the following formula was obtained.

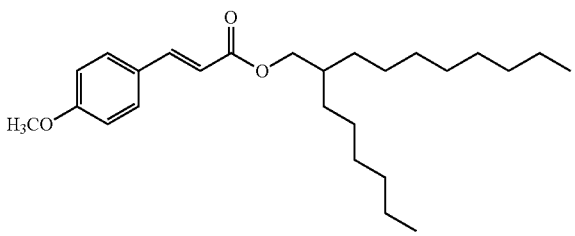

B1

[Low-Molecular-Weight Compound B2]

A low-molecular-weight compound B2 (NOMUCOAT TAB, manufactured by THE NISSHIN OILLIO GROUP, LTD.) represented by the following formula was used.

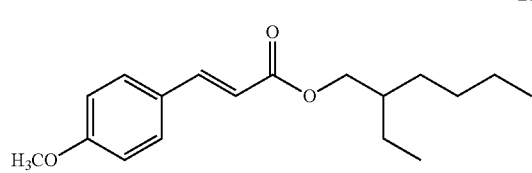

B2

[Crosslinking Agent C1]

A crosslinking agent C1 (DENACOL EX411, manufactured by Nagase ChemteX Corporation) represented by the following formula was used.

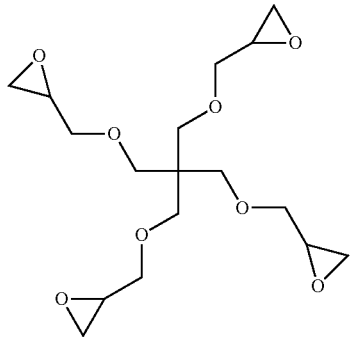

[Compound D1]

A compound D1 (ALUMICHELATE A (W), manufactured by Kawaken Fine Chemicals Co., Ltd.) represented by the following formula was used.

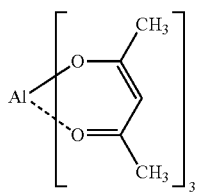

[Compound D2]

A compound D2 (triphenylsilanol, manufactured by Toyo Science Corp.) represented by the following formula was used.

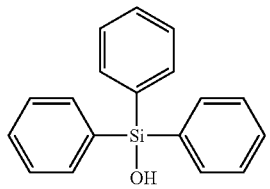

[Compound D3]

A compound D3 (TA-60B, manufactured by San-Apro Ltd.) represented by the following formula was used.

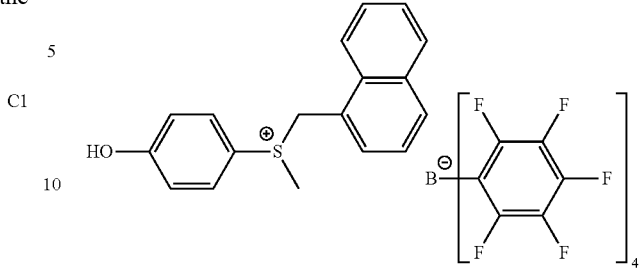

[Compound E1]

10 parts by mass of NOMUCOAT TAB (manufactured by THE NISSHIN OILLIO GROUP, LTD.), 20 parts by mass of butyl acetate, and 5 parts by mass of palladium activated carbon were put into a 100 mL autoclave, and hydrogen substitution was performed. Then, the mixture was stirred for 6 hours at room temperature with slight pressurization. After the reaction was terminated, the reaction solution was filtered with celite, and the filtrate was water-washed three times. Concentrating the solution and subjecting the solution to chromatographic purification (silica gel, mixture eluent of ethyl acetate and hexane) were repeated two times, and finally, 2-ethylhexyl p-methoxyphenyl propionate (hereinafter, referred to as "compound E1") having no optical aligning group represented by Formula E1 was obtained.

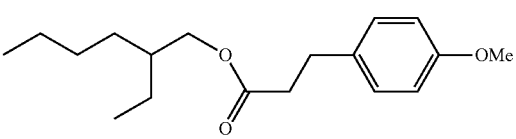

Examples 1 to 9 and Comparative Examples 1 and 2

[Preparation of Optical Alignment Film Composition]

A polymer A, a low-molecular-weight compound B, and the like shown in the following Table 1 were added to butyl acetate such that the amounts (parts by mass) thereof were as shown in the following Table 1, and an optical alignment film composition was prepared.

[Preparation of Optical Anisotropic Layer Forming Composition]

Optical anisotropic layer coating liquids having the following compositions (liquid crystals 1 to 4), respectively, were prepared.

| Optical Anisotropic Layer Coating Liquid (liquid crystal 1) | |
|---|---|
| Following Liquid Crystal Compound L-1 | 80.00 parts by mass |
| Following Liquid Crystal Compound L-2 | 20.00 parts by mass |
| Polymerization Initiator (IRGACURE 184, manufactured by BASF SE) | 3.00 parts by mass |
| Polymerization Initiator (IRGACURE OXE-01, manufactured by BASF SE) | 3.00 parts by mass |
| Leveling Agent (following compound G-1) | 0.20 parts by mass |
| Methyl Ethyl Ketone | 424.8 parts by mass |

-continued

Optical Anisotropic Layer Coating Liquid (liquid crystal 1)

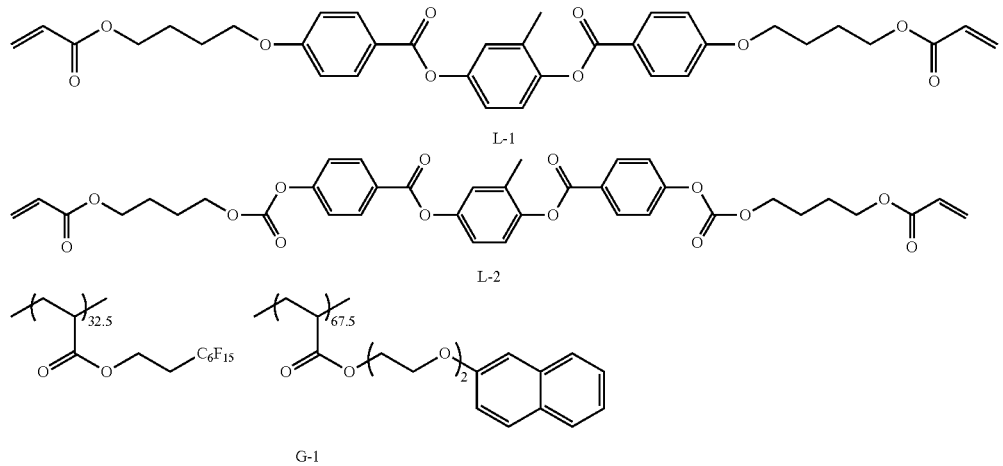

L-1

L-2

G-1

The numerical values in the structure of the compound G-1 represent mass %.

| Optical Anisotropic Layer Coating Liquid (liquid crystal 2) | |
|---|---|
| Following Liquid Crystal Compound L-3 | 43.75 parts by mass |
| Following Liquid Crystal Compound L-4 | 43.75 parts by mass |
| Following Polymerizable Compound A-1 | 12.50 parts by mass |
| Following Polymerization Initiator S-1 (oxime type) | 3.00 parts by mass |
| Leveling Agent (above compound G-1) | 0.20 parts by mass |
| HISOLVE MTEM (manufactured by TOHO Chemical Industry Co., Ltd.) | 2.00 parts by mass |

-continued

| Optical Anisotropic Layer Coating Liquid (liquid crystal 2) | |
|---|---|
| NK ESTER A-200 (manufactured by Shin-Nakamura Chemical Co., Ltd.) | 1.00 part by mass |
| Methyl Ethyl Ketone | 424.8 parts by mass |

The group adjacent to the acryloyloxy group of the following liquid crystal compounds L-3 and L-4 represents a propylene group (group in which a methyl group was substituted with an ethylene group). Each of the following liquid crystal compounds L-3 and L-4 represents a mixture of regioisomers with different methyl group positions.

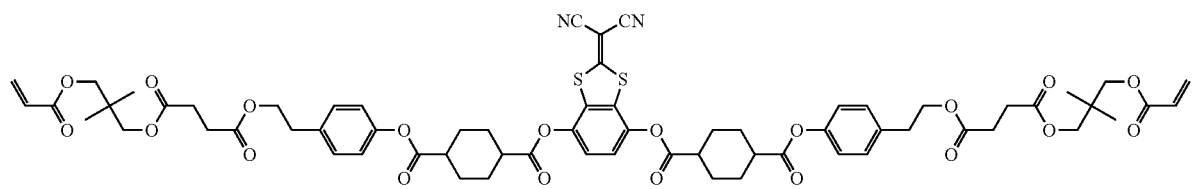

L-3

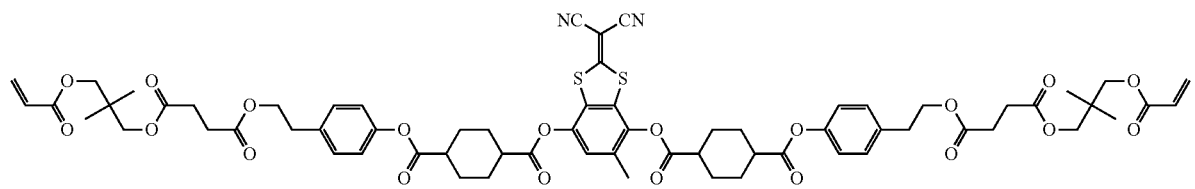

L-4

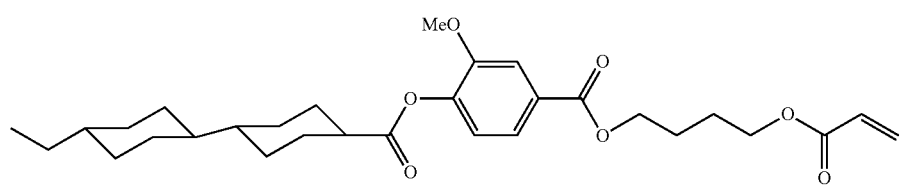

A-1

-continued

S-1

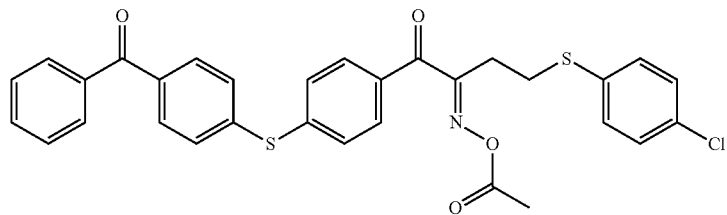

| Optical Anisotropic Layer Coating Liquid (liquid crystal 3) | |
|---|---|
| Above Liquid Crystal Compound L-3 | 42.00 parts by mass |
| Above Liquid Crystal Compound L-4 | 42.00 parts by mass |
| Above Polymerizable Compound A-1 | 16.00 parts by mass |
| Above Polymerization Initiator S-1 (oxime type) | 0.50 parts by mass |
| Leveling Agent (above compound G-1) | 0.20 parts by mass |
| HISOLVE MTEM (manufactured by TOHO Chemical Industry Co., Ltd.) | 2.00 parts by mass |
| NK ESTER A-200 (manufactured by Shin-Nakamura Chemical Co., Ltd.) | 1.00 part by mass |
| Methyl Ethyl Ketone | 424.8 parts by mass |

| Optical Anisotropic Layer Coating Liquid (liquid crystal 4) | |
|---|---|
| Above Liquid Crystal Compound L-3 | 36.10 parts by mass |
| Above Liquid Crystal Compound L-4 | 18.90 parts by mass |
| Following Liquid Crystal Compound R-1 | 45.00 parts by mass |
| Following Polymerizable Compound A-2 | 0.50 parts by mass |
| Above Polymerization Initiator S-1 (oxime type) | 1.50 parts by mass |
| Leveling Agent (following compound G-2) | 0.03 parts by mass |
| Ethylene Oxide-Modified Trimethylolpropane Triacrylate (V#360, manufactured by OSAKA ORGANIC CHEMICAL INDUSTRY LTD.) | 12.00 parts by mass |
| Methyl Ethyl Ketone | 424.8 parts by mass |

The liquid crystal compound R-1 is a mixture of the following liquid crystal compounds (RA), (RB), and (RC) at a ratio (mass ratio) of 83:15:2,

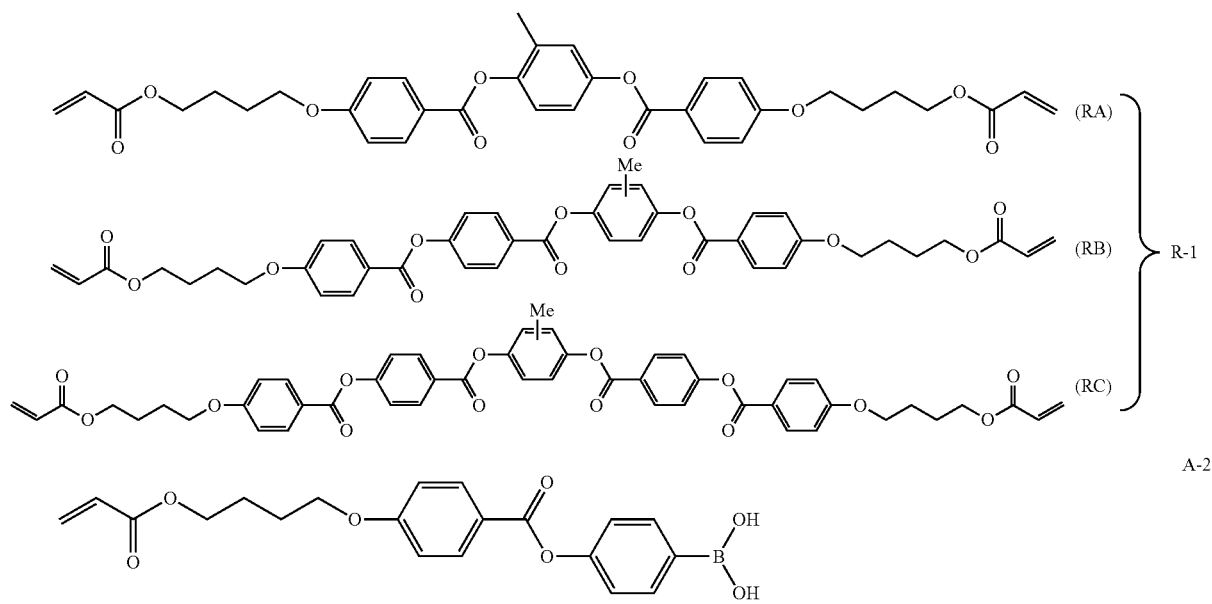

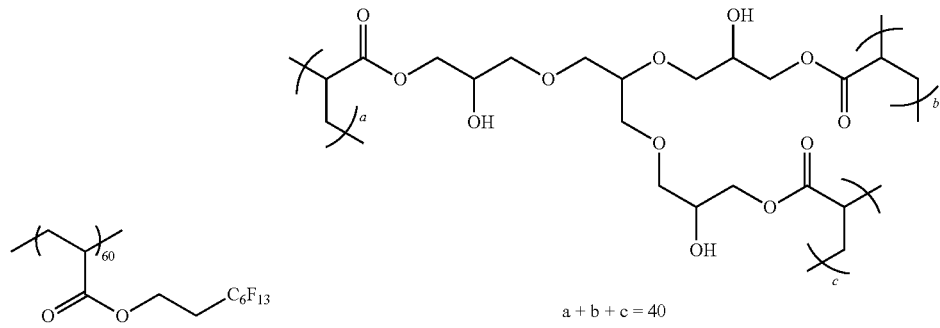

$a + b + c = 40$

The numerical values in the structure of the compound G-2 represent mass %.

[Production of Polarizer 1]

In accordance with Example 1 of JP2001-141926A, iodine was adsorbed to a stretched polyvinyl alcohol film, and thus a polarizer 1 having a thickness of 8 μm was produced.

[Production of Optical Laminate]

The optical alignment film composition prepared in advance was coated on one surface of the produced polarizer 1 by a spin coating method.

After the coating, the solvent was removed by drying for 5 minutes on a hot plate at 80° C., and a photoisomerization composition layer having a thickness of 0.2 μm was formed, The obtained photoisomerization composition layer was irradiated with polarized ultraviolet rays (20 mJ/cm², using extra-high-pressure mercury lamp), and thus an optical alignment film was formed.

Next, the liquid crystal 1 or 2 (optical anisotropic layer forming composition) prepared in advance was coated on the optical alignment film by a spin coating method, and a composition layer was formed.

The formed composition layer was heated to 90° C. on a hot plate, and then cooled to 60° C. to stabilize the alignment. In this case, in a case where the liquid crystal 2 was used, the alignment was stabilized in a smectic-A phase.

Then, the layer was kept at 60° C. and irradiated with ultraviolet rays (500 mJ cm², using extra-high-pressure mercury lamp) in a nitrogen atmosphere (oxygen concentration: 100 ppm) to stabilize the alignment, and thus an optical anisotropic layer A1 having a thickness of 2.0 μm was formed and an optical laminate was produced.

Example 10

[Production of Cellulose Support 1]

<Production of Core Layer Cellulose Acylate Dope>

The following composition was put into a mixing tank and stirred to dissolve the respective components, and thus a cellulose acetate solution to be used as a core layer cellulose acylate dope was prepared.

| Core Layer Cellulose Acylate Dope | |
|---|---|
| Cellulose Acetate Having Acetyl Substitution Degree of 2.88 | 100 parts by mass |
| Polyester A | 12 parts by mass |
| Methylene Chloride (first solvent) | 430 parts by mass |
| Methanol (second solvent) | 64 parts by mass |

As the polyester A, polyester A described in [Table 1] of JP2015-227956A was used.

<Production of Outer Layer Cellulose Acylate Dope>

10 parts by mass of the following matting agent solution was added to 90 parts by mass of the core layer cellulose acylate dope, and thus a cellulose acetate solution to be used as an outer layer cellulose acylate dope was prepared.

| Matting Agent Solution | |
|---|---|
| Silica Particles Having Average Particle Size of 20 nm (AEROSIL R972, manufactured by NIPPON AEROSIL CO., LTD.) | 2 parts by mass |
| Methylene Chloride (first solvent) | 76 parts by mass |
| Methanol (second solvent) | 11 parts by mass |
| Core Layer Cellulose Acylate Dope | 1 part by mass |

The core layer cellulose acylate dope and the outer layer cellulose acylate dope were filtered using filter paper having an average pore diameter of 34 μm and a sintered metallic filter having an average pore diameter of 10 μm. Then, three layers of the core layer cellulose acylate dope and the outer layer cellulose acylate dopes on both sides of the core layer cellulose acylate dope were simultaneously cast on a drum at 20° C. from a casting port by using a band casting machine.

Next, in a state in which the solvent content was approximately 20 mass %, the film was peeled off. Both ends of the film in a width direction were fixed with tenter clips, and the film was dried while being stretched by 1.1 times of that of the peeled film in a transverse direction.

Thereafter, the film was further dried by transporting between rolls of a heat treatment device, thereby producing a cellulose support 1 having a thickness of 20 μm. The thickness of the core layer in the produced cellulose support 1 was 15 μm, and each of the thicknesses of the outer layers disposed on both sides of the core layer was 2.5 μm.

[Production of Optical Laminate]

<Formation of Optical Anisotropic Layer>

The optical alignment film composition prepared in advance was coated on one surface of the produced cellulose support 1 by a spin coating method.

After the coating, the solvent was removed by drying for 5 minutes on a hot plate at 80° C., and a photoisomerization composition layer having a thickness of 0.5 μm was formed.

The obtained photoisomerization composition layer was irradiated with polarized ultraviolet rays (20 mJ/cm², using extra-high-pressure mercury lamp), and thus an optical alignment film was formed.

Next, the liquid crystal 2 (optical anisotropic layer forming composition) prepared in advance was coated on the optical alignment film by a spin coating method, and a composition layer was formed.

The formed composition layer was heated to 90° C. on a hot plate, and then cooled to 60° C. to stabilize the alignment. In this case, the alignment was stabilized in a smectic-A phase.

Then, the layer was kept at 60° C. and irradiated with ultraviolet rays (500 mJ/cm², using extra-high-pressure mercury lamp) in a nitrogen atmosphere (oxygen concentration: 100 ppm) to stabilize the alignment, and thus an optical anisotropic layer A10 having a thickness of 2.0 μm was formed.

<Film Saponification>

The cellulose support 1 with the optical anisotropic layer produced as described above was immersed for 1 minute in a 4.5 mol/L aqueous solution of sodium hydroxide (saponification liquid) of which the temperature had been adjusted to 37° C. Thereafter, the film was water-washed, and then immersed for 30 seconds in a 0.05 mol/L aqueous solution of sulfuric acid. Then, the film was allowed to pass through a water-washing bath. Draining by an air knife was repeated three times, water was dropped, and then the film was allowed to stay for 15 seconds in a drying zone at 70° C. A film subjected to a saponification treatment was produced.

<Sticking>

Using a 3% aqueous solution of polyvinyl alcohol (PVA-117H, manufactured by KURARAY CO., LTD.) as an adhesive, the polarizer 1 produced as described above was stuck to a surface on the side of the cellulose support 1 of the film subjected to a saponification treatment in a roll-to-roll manner such that a polarization axis and a longitudinal direction of the film were perpendicular to each other, and thus an optical laminate was produced.

Example 11

[Production of Cellulose Support 2]

The following composition was put into a mixing tank. The components therein were dissolved by stirring and heating to 30° C., and cellulose acylate solutions (inner layer dope A and outer layer dope B) were prepared.

| Composition of Cellulose Acylate Solution (parts by mass) | Inner Layer | Outer Layer |
| --- | --- | --- |
| Cellulose Acetate Having Acetylation Degree of 60.9% | 100 | 100 |
| Triphenyl Phosphate (plasticizer) | 7.8 | 7.8 |
| Biphenyl Diphenyl Phosphate (plasticizer) | 3.9 | 3.9 |
| Methylene Chloride (first solvent) | 293 | 314 |
| Methanol (second solvent) | 71 | 76 |
| 1-Butanol (third solvent) | 1.5 | 1.6 |
| Silica Particles (AEROSIL R972, manufactured by NIPPON AEROSIL CO., LTD.) | 0 | 0.8 |
| Following Additive (J-1) | 1.7 | 0 |

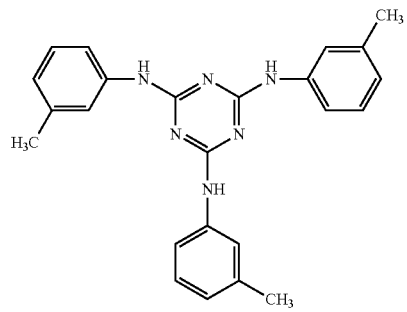

J-1

The inner layer dope A and the outer layer dope B which had been obtained were cast on a drum cooled to 0° C. using a three-layer co-casting die. The film having a residual solvent amount of 70 mass % was separated from the drum, and both ends thereof were fixed with a pin tenter. The film was dried at 80° C. while being transported with a draw ratio of 110% in a transport direction, and dried at 110° C. in a case where the residual solvent amount became 10%. Thereafter, the film was dried for 30 minutes at a temperature of 140° C. to manufacture a cellulose acylate film (thickness: 80 μm (outer layer: 3 μm, inner layer: 74 μm, outer layer: 3 μm)) having a residual solvent amount of 0.3 mass %. Re (550) and Rth (550) of the produced cellulose acylate film were 5 nm and 90 nm, respectively.

[Production of Optical Laminate]

<Preparation of Resin Layer Forming Composition>

A resin layer coating liquid having the following composition (resin layer 1) was prepared.

| Resin Layer Coating Liquid (resin layer 1) | |
| --- | --- |
| Tricyclodecane Dimethanol Dimethacrylate (manufactured by Shin-Nakamura. Chemical Co., Ltd., trade name "DCP", following H-1) | 75.00 parts by mass |
| Following Pentaerythritol Tetraacrylate (manufactured by Shin-Nakamura Chemical Co., Ltd., trade name "A-TMMT", following H-2) | 25.00 parts by mass |
| Above Polymerization Initiator S-1 (oxime type) | 1.50 parts by mass |
| Leveling Agent (following compound G-2) | 0.10 parts by mass |
| Modified Ethanol (manufactured by Wako Pure Chemical Industries, Ltd., trade name "86% Ethanol-IP") | 424.8 parts by mass |

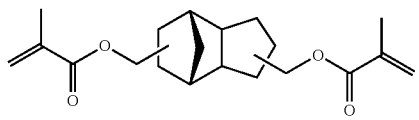

H-1

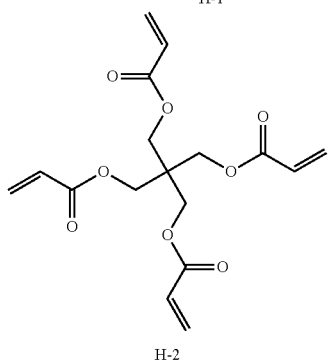

H-2

<Formation of Optical Anisotropic Layer>

The resin layer forming composition prepared in advance was coated on one surface of the produced cellulose support 2 by using a die coater. After drying for 60 seconds at 100° C., the coating layer was cured by being irradiated with 60 mJ/cm$^2$ of ultraviolet rays using an extra-high-pressure mercury lamp in a nitrogen atmosphere (oxygen concentration: 100 ppm), and thus a resin layer having a thickness of 1.0 μm was formed.

Next, the optical alignment film composition prepared in advance was coated on the produced resin layer by a bar coater method. The solvent was removed by drying for 5 minutes at 125° C., and a photoisomerization composition layer having a thickness of 0.2 μm was formed.

The obtained photoisomerization composition layer was irradiated with polarized ultraviolet rays (20 mJ/cm$^2$, using extra-high-pressure mercury lamp), and thus an optical alignment was formed.

Next, the liquid crystal 3 (optical anisotropic layer forming composition) prepared in advance was coated on the optical alignment film by a bar coater method, and a composition layer was formed. The formed composition layer was heated to 105° C., and then gradually cooled to 60° C. to stabilize the alignment. In this case, the alignment was stabilized in a smectic-A phase.

Then, the layer was kept at 60° C. and irradiated with ultraviolet rays (500 mJ/cm$^2$, using extra-high-pressure mercury lamp) in a nitrogen atmosphere (oxygen concentration: 100 ppm) to stabilize the alignment, and thus an optical anisotropic layer A11 having a thickness of 2.0 μm was formed.

<Transfer>

The polarizer 1 produced as described above was stuck to the optical anisotropic layer A11 formed on the cellulose support 2 produced as described above by using a pressure sensitive adhesive SK-2057 (manufactured by Soken Chemical & Engineering Co., Ltd.). Next, the cellulose support 2 was peeled off, and thus an optical laminate including the polarizer 1 and the optical anisotropic layer A11 was produced.

Example 12

An optical laminate having a peeling layer, an optical alignment film, and an optical anisotropic layer A12 in this order on a cellulose support 2 was produced in the same manner as in Example 11.

An optical laminate including a polarizer 1 and an optical anisotropic layer A12 was produced in the same manner as in Example 11, except that the polarizer and the optical anisotropic layer A12 were stuck to each other using an acrylic adhesive in place of the pressure sensitive adhesive in Example 11.

<Absorption Ratio>

An optical alignment film was formed on a triacetyl cellulose film in the same manner as in the case of the optical laminate.

Next, methyl ethyl ketone was coated on the optical alignment film by a spin coating method by simulating the coating with the optical anisotropic layer forming composition. Drying was performed thereon, and a laminate sample was produced.

Using an ultraviolet-visible near infrared spectrophotometer provided with a Glan-Thompson polarizer (V-7200 manufactured by JASCO Corporation), measurement light as linearly polarized light was made incident to measure the absorbance of the produced laminate sample at a wavelength of 290 nm. The absorbance of the triacetyl cellulose film was subtracted from the measured value to obtain the absorbance of the optical alignment film alone.

An absorption ratio (Ac/Ap) was obtained, where Ap is the absorbance in a direction parallel to the polarization direction of the polarized ultraviolet rays applied in the production of the optical alignment film, and Ac is the absorbance in a direction perpendicular thereto. The results are shown in the following Table 1. The higher the absorption ratio, the higher the degree of alignment.

<Aligning Properties>

The produced optical laminate was observed using a polarizing microscope in a state of being deviated by 2 degrees from the extinction position. As a result, evaluation was performed with the following standards. The results are shown in the following Table 1.

AAA: Liquid crystal directors are finely arranged and aligned, and display performance is very excellent.

AA: Liquid crystal directors are uniformly arranged and aligned, and display performance is excellent.

A: There is no disorder of liquid crystal directors, and the plane state is stable.

B: There is slight disorder of liquid crystal directors, and the plane state is stable.

C: There is partial disorder of liquid crystal directors, and the plane state is stable.

D: Liquid crystal directors are significantly disordered, and the plane state is unstable, whereby display performance is very poor.

In this specification, the stable plane state means a state in which defects such as unevenness or alignment errors are not observed in a ease where an optical laminate is installed and observed between two polarizing plates disposed in a crossed Nicol manner.

In this specification, the liquid crystal directors mean vectors in an alignment direction of the long axes of liquid crystalline molecules (principal alignment axis).

TABLE 1

| Table 1 | Polymer A | Low-Molecular-Weight Compound B, etc. | | | Crosslinking Agent C | Crosslinking Catalyst |
| --- | --- | --- | --- | --- | --- | --- |
| | | Material | Molecular Weight | Content* (mass %) | | |
| Comparative Example 1 | Polymer A1 | — | — | 0 | — | — |
| Comparative Example 2 | Polymer A1 | Compound E1 | 292 | 10 | — | — |
| Example 1 | Polymer A1 | Low-Molecular-Weight Compound B2 | 290 | 10 | — | — |

TABLE 1-continued

| Table 1 | Polymer A | Low-Molecular-Weight Compound B, etc. | | | | |
|---|---|---|---|---|---|---|
| Example 2 | Polymer A1 | Low-Molecular-Weight Compound B2 | 290 | 50 | — | — |
| Example 3 | Polymer A1 | Low-Molecular-Weight Compound B2 | 290 | 150 | — | — |
| Example 4 | Polymer A1 | Low-Molecular-Weight Compound B2 | 290 | 500 | — | — |
| Example 5 | Polymer A1 | Low-Molecular-Weight Compound B1 | 403 | 78 | — | — |
| Example 6 | Polymer A2 | Low-Molecular-Weight Compound B1 | 403 | 78 | — | Compound D1 Compound D2 |
| Example 7 | Polymer A2 | Low-Molecular-Weight Compound B2 | 290 | 78 | — | Compound D1 Compound D2 |
| Example 8 | Polymer A2 | Low-Molecular-Weight Compound B2 | 290 | 78 | — | Compound D1 Compound D2 |
| Example 9 | Polymer A2 | Low-Molecular-Weight Compound B2 | 290 | 78 | Crosslinking Agent C1 | Compound D1 Compound D2 |
| Example 10 | Polymer A2 | Low-Molecular-Weight Compound B2 | 290 | 78 | Crosslinking Agent C1 | Compound D1 Compound D2 |
| Example 11 | Polymer A5 | Low-Molecular-Weight Compound B2 | 290 | 78 | — | Compound D3 |
| Example 12 | Polymer A5 | Low-Molecular-Weight Compound B2 | 290 | 78 | — | Compound D3 |

| | Amount Added with respect to 100 parts by mass of Solvent (parts by mass) | | | | Optical | Performance | |
|---|---|---|---|---|---|---|---|
| Table 1 | Polymer A | Low-Molecular-Weight Compound B, etc. | Cross-linking Agent C | Cross-linking Catalyst | Anisotropic Layer | Absorption Ratio | Aligning Properties |
| Comparative Example 1 | 1.03 | 0 | 0 | 0 | Liquid Crystal 1 | 1.00 | D |
| Comparative Example 2 | 1.03 | 0.1 | 0 | 0 | Liquid Crystal 1 | 1.00 | D |
| Example 1 | 1.03 | 0.1 | 0 | 0 | Liquid Crystal 1 | 1.01 | C |
| Example 2 | 1.03 | 0.5 | 0 | 0 | Liquid Crystal 1 | 1.02 | B |
| Example 3 | 1.03 | 1.5 | 0 | 0 | Liquid Crystal 1 | 1.02 | B |
| Example 4 | 1.03 | 5.2 | 0 | 0 | Liquid Crystal 1 | 1.01 | C |
| Example 5 | 1.03 | 0.8 | 0 | 0 | Liquid Crystal 1 | 1.02 | B |
| Example 6 | 4.35 | 0.8 | 0 | D1/D2 0.48/1.15 | Liquid Crystal 1 | 1.03 | A |
| Example 7 | 4.35 | 0.8 | 0 | D1/D2 0.48/1.15 | Liquid Crystal 1 | 1.04 | AA |
| Example 8 | 4.35 | 0.8 | 0 | D1/D2 0.48/1.15 | Liquid Crystal 2 | 1.04 | AAA |
| Example 9 | 4.35 | 0.8 | 2.2 | D1/D2 0.48/1.15 | Liquid Crystal 2 | 1.06 | AAA |
| Example 10 | 4.35 | 0.8 | 2.2 | D1/D2 0.48/1.15 | Liquid Crystal 2 | 1.06 | AAA |
| Example 11 | 4.35 | 0.8 | 0 | 0.22 | Liquid Crystal 3 | 1.06 | AAA |
| Example 12 | 4.35 | 0.8 | 0 | 0.22 | Liquid Crystal 3 | 1.06 | AAA |

*The content of the low-molecular-weight compound B, etc. refers to mass % with respect to the mass of the constitutional unit a1 of the polymer A.

From the results shown in Table 1, it was found that in a case where only the polymer A was mixed for preparation with no mixing of the low-molecular-weight compound B, the aligning properties were poor (Comparative Examples 1 and 2).

In contrast, it was found that in a case where all the polymer A and the low-molecular-weight compound B were mixed for preparation, the aligning properties were improved (Examples 1 to 12).

Particularly, it was found that the aligning properties were further improved in a case where the content of the low-molecular-weight compound B was 30 to 300 mass % with respect to the mass of the constitutional unit a1 of the polymer A from the comparison between Examples 1 to 4.

In addition, it was found that the aligning properties were further improved in a case where the optical anisotropic layer was formed of a liquid crystal compound exhibiting smectic properties from the comparison between Examples 7 and 8.

In addition, it was found that it was possible to realize good aligning properties in both of a case where the surfaces of the optical alignment film on the optical anisotropic layer side and on the opposite side were adjacent to the polarizer and a case where the above-described surfaces were adjacent to the polymer film from the comparison between Examples 9 and 10.

Furthermore, it was found that it was possible to realize good aligning properties even in a case where the surface of the optical anisotropic layer was adjacent to the polarizer via a pressure sensitive adhesive or an adhesive from the comparison between Examples 9 to 12, The optical anisotropic layer A9 or A10 of the optical laminate in Example 9 or 10 was confirmed to be aligned in the plane and to have optical performance of Re (550)=145 nm and Re (450)/Re (550)=0.86. In addition, the absorption axis of the polarizer 1 was perpendicular to the in-plane slow axis of the optical anisotropic layer A9 or A10.

Example 13

[Production of Optical Laminate]
<Formation of Optical Anisotropic Layer B13>

The liquid crystal 4 (optical anisotropic layer forming composition) prepared in advance was coated on the optical anisotropic layer A9 of the optical laminate of Example 9 produced as described above by a bar coater method, and a composition layer was formed. The formed composition layer was heated for 50 seconds at 70° C. In this case, the liquid crystalline molecules were aligned perpendicularly to the film surface.

Then, the alignment was fixed by ultraviolet irradiation (500 mJ/cm$^2$, using extra-high-pressure mercury lamp) in a nitrogen atmosphere (oxygen concentration: 100 ppm) at 60° C., and thus an optical anisotropic layer B13 having a thickness of 1.3 μm was formed.

The optical anisotropic layer B13 produced as described above was confirmed to be aligned perpendicularly to the film surface and to have optical performance of Rth (550)=−103 nm and Rth (450)/Rth (550)=0.95.

Example 14

[Production of Optical Laminate]
<Formation of Optical Anisotropic Layer B14>

An optical anisotropic layer B14 was formed on the optical anisotropic layer A10 in the same manner as in Example 13, except that the optical laminate of Example 10 was used in place of the optical laminate of Example 9 in Example 13.

The optical anisotropic layer B14 produced as described above was confirmed to be aligned perpendicularly to the film surface and to have optical performance of Rth (550)=−103 nm and Rth (450)/Rth (550)=0.95.

Example 15

[Production of Optical Laminate]
<Formation of Optical Anisotropic Layer B15>

The resin layer forming composition prepared in advance was coated on one surface of the produced cellulose support 2 by using a die coater. After drying for 60 seconds at 100° C., the coating layer was cured by being irradiated with 60 mJ/cm$^2$ of ultraviolet rays using an extra-high-pressure mercury lamp in a nitrogen atmosphere (oxygen concentration: 100 ppm), and thus a resin layer having a thickness of 1.0 μm was formed.

Next, the liquid crystal 4 (optical anisotropic layer forming composition) prepared in advance was coated on the produced resin layer by a bar coater method, and a composition layer was formed. The formed composition layer was heated for 50 seconds at 70° C. In this case, the liquid crystalline molecules were aligned perpendicularly to the film surface.

Then, the alignment was fixed by ultraviolet irradiation (200 mJ/cm$^2$, using extra-high-pressure mercury lamp) in an atmosphere having an oxygen concentration of 3% at 60° C., and thus an optical anisotropic layer B15 having a thickness of 1.3 μm was formed.

The optical anisotropic layer B15 produced as described above was confirmed to be aligned perpendicularly to the film surface and to have optical performance of Rth (550)=−103 nm and Rth (450)/Rth (550)=0.95.

<Formation of Optical Anisotropic Layer A15>

Next, the optical alignment film composition prepared in advance was coated on the optical anisotropic layer B15 by a bar coater method. The solvent was removed by drying for 5 minutes at 125° C., and a photoisomerization composition layer having a thickness of 0.2 μm was formed.

The obtained photoisomerization composition layer was irradiated with polarized ultraviolet rays (20 mJ/cm$^2$, using extra-high-pressure mercury lamp), and thus an optical alignment film was formed.

Next, the liquid crystal 3 (optical anisotropic layer forming composition) prepared in advance was coated on the optical alignment film by a bar coater method, and a composition layer was formed. The formed composition layer was heated to 105° C., and then gradually cooled to 60° C. to stabilize the alignment. In this case, the alignment was stabilized in a smectic-A phase.

Then, the layer was kept at 60° C. and irradiated with ultraviolet rays (500 mJ/cm$^2$, using extra-high-pressure mercury lamp) in a nitrogen atmosphere (oxygen concentration; 100 ppm) to stabilize the alignment, and thus an optical anisotropic layer A15 having a thickness of 2.0 μm was formed.

The optical anisotropic layer A15 was confirmed to be aligned in the plane and to have optical performance of Re (550)=145 nm and Re (450)/Re (550)=0.86.

<Transfer>

The polarizer 1 produced as described above was stuck to the optical anisotropic layer A15 formed on the cellulose support 2 produced as described above by using a pressure sensitive adhesive SK-2057 (manufactured by Soken Chemical R. Engineering Co., Ltd.). In this case, the polarizer and the optical anisotropic layer were stuck to each other such that the absorption axis of the polarizer 1 was perpendicular to the in-plane slow axis of the optical anisotropic layer A15.

Next, the cellulose support 2 was peeled off, and thus an optical laminate including the polarizer 1, the optical anisotropic layer A15, and the optical anisotropic layer B15 was produced.

Example 16

[Production of Optical Laminate]
<Formation of Optical Anisotropic Layers A16 and B16>

An optical laminate having a peeling layer, an optical anisotropic layer B16, an optical alignment film, and an optical anisotropic layer A16 in this order on a cellulose support 2 was produced in the same manner as in Example 15.

The optical anisotropic layer B16 produced as described above was confirmed to be aligned perpendicularly to the film surface and to have optical performance of Rth (550)=−103 nm and Rth (450)/Rth (550)=0.95. In addition, the optical anisotropic layer A16 was confirmed to be aligned in the plane and to have optical performance of Re (550)=145 nm and Re (450)/Re (550)=0.86.

<Transfer>

An optical laminate including a polarizer 1, an optical anisotropic layer A16, and an optical anisotropic layer B16 was produced in the same manner as in Example 15, except that the polarizer and the optical anisotropic layer A16 were stuck to each other using an acrylic adhesive in place of the pressure sensitive adhesive in Example 15.

[Mounting on Liquid Crystal Display Device and Display Performance Evaluation]

<Mounting on Liquid Crystal Display Device>

An IPS mode liquid crystal display device iPad (registered trademark) (manufactured by Apple Inc.) was disassembled, and a front-side polarizing plate was peeled off from a liquid crystal cell. Next, the optical laminates of Examples 13 to 16 produced as described above were prepared, and any one of them was adhered to the front side of the liquid crystal cell by using a pressure sensitive adhesive SK-2057 (manufactured by Soken Chemical & Engineering Co., Ltd.) to produce a liquid crystal display device. In this case, the mounting was performed such that absorption axis of the polarizer of any one of the optical laminates of Examples 13 to 16 was perpendicular to the absorption axis of the rear-side polarizing plate, and the optical anisotropic layer was disposed closer to the liquid crystal cell side than the polarizer.

<Evaluation of Liquid Crystal Display Device>

The liquid crystal display device on which any one of the optical laminates of Examples 13 to 16 was mounted was confirmed to have high front CR equal to that of the product and to have a larger view angle CR than the product. Moreover, the above liquid crystal display device had little color change in a case of being visually confirmed in an oblique direction at the time of black display, and had excellent characteristics as a liquid crystal display device.

EXPLANATION OF REFERENCES

1: optical alignment film
2: optical anisotropic layer
2a: first optical anisotropic layer
2b: second optical anisotropic layer
3: support
3a: polarizer
3b: polymer film
3c: temporary support
4: resin layer
5: adhesive layer or pressure sensitive adhesive layer
6: another optical anisotropic layer
10, 20, 30, 40, 50, 60, 70: optical laminate

What is claimed is:

1. An optical alignment film composition comprising:
    a polymer A which has a constitutional unit a1 including a cinnamate group; and
    a low-molecular-weight compound B which has a cinnamate group and has a lower molecular weight than the polymer A,
    wherein the low-molecular-weight compound B is a compound represented by Formula (B1),

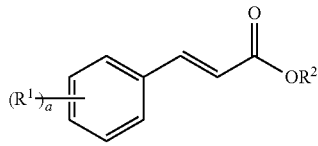

(B1)

here, in Formula (B1), a represents an integer of 0 to 5, $R^1$ represents a chain or cyclic alkyl group having 1 to 20 carbon atoms, an alkoxy group having 1 to 20 carbon atoms, or an aryl group having 6 to 20 carbon atoms which may have a substituent, and $R^2$ represents a branched-chain alkyl group having 1 to 20 carbon atoms, and in a case where a is 2 or greater, a plurality of $R^1$'s may be the same as or different from each other.

2. The optical alignment film composition according to claim 1,
    wherein the low-molecular-weight compound B has a molecular weight of 200 to 500.

3. The optical alignment film composition according to claim 1,
    wherein the content of the low-molecular-weight compound B is 10 to 500 mass % with respect to the mass of the constitutional unit a1 of the polymer A.

4. The optical alignment film composition according to claim 1,
    wherein the compound represented by Formula (B1) is isopropyl-p-methoxycinnamate, isoamyl-p-methoxycinnamate, 2-ethylhexyl-p-methoxycinnamate, 2-ethoxyethyl-p-methoxycinnamate, or 2-hexyldecanyl-p-methoxycinnamate.

5. The optical alignment film composition according to claim 1,
    wherein the polymer A further has a constitutional unit a2 including a crosslinkable group.

6. The optical alignment film composition according to claim 1, further comprising:
    a crosslinking agent C having a crosslinkable group.

7. An optical alignment film which is produced using the optical alignment film composition according to claim 1, comprising:
    at least one selected from the group consisting of a cyclobutane ring provided by dimerization of the cinnamate groups of the polymer A and the low-molecular-weight compound B included in the optical alignment film composition and a structure provided by isomerization of the cinnamate groups.

8. An optical laminate comprising:
    the optical alignment film according to claim 7; and
    an optical anisotropic layer which is provided on the optical alignment film and contains a liquid crystal compound.

9. The optical laminate according to claim 8, comprising, in order:
    a support;
    the optical alignment film; and
    the optical anisotropic layer.

10. The optical laminate according to claim 9,
    wherein a glass transition temperature of the support is 100° C. or lower.

11. The optical laminate according to claim 9,
    wherein the support is a polarizer.

12. The optical laminate according to claim 9, further comprising:
    a resin layer between the support and the optical alignment film,
    wherein the resin layer contains a compound having a partial structure represented by Formula (X)

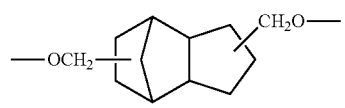

(X)

13. The optical laminate according to claim 12, further comprising:
   another optical anisotropic layer which is different from the optical anisotropic layer between the resin layer and the optical alignment film.

14. The optical laminate according to claim 13,
   wherein another optical anisotropic layer contains a liquid crystal compound.

15. An optical laminate which is produced by laminating the optical laminate according to claim 9 on a polarizer and by peeling off the support in the optical laminate,
   wherein the optical anisotropic layer and the polarizer are laminated.

16. An image display device comprising:
   the optical laminate according to claim 8.

17. The image display device according to claim 16, comprising, in order:
   a polarizer;
   an adhesive layer or a pressure sensitive adhesive layer;
   an optical anisotropic layer;
   an optical alignment film;
   an adhesive layer or a pressure sensitive adhesive layer; and
   a display element,
   wherein no support is provided between the optical alignment film and the display element.

18. The optical alignment film composition according to claim 2,
   wherein the content of the low-molecular-weight compound B is 10 to 500 mass % with respect to the mass of the constitutional unit a1 of the polymer A.

19. The optical alignment film composition according to claim 6,
   wherein the crosslinking agent C is a compound having two or more epoxy groups or oxetanyl groups in the molecule.

20. The optical alignment film composition according to claim 19,
   wherein the crosslinking agent C has a molecular weight of 100 to 500.

* * * * *